(12) United States Patent
Yano et al.

(10) Patent No.: US 8,415,444 B2
(45) Date of Patent: Apr. 9, 2013

(54) CURABLE COMPOSITION

(75) Inventors: Ayako Yano, Takasago (JP); Noriko Matsushita, Takasago (JP); Takeshi Sonoda, Takasago (JP); Shintaro Komitsu, Westerlo-Oevel (BE)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 12/522,872

(22) PCT Filed: Dec. 21, 2007

(86) PCT No.: PCT/JP2007/074626
§ 371 (c)(1),
(2), (4) Date: Sep. 9, 2009

(87) PCT Pub. No.: WO2008/084651
PCT Pub. Date: Jul. 17, 2008

(65) Prior Publication Data
US 2010/0004367 A1  Jan. 7, 2010

(30) Foreign Application Priority Data
Jan. 12, 2007 (JP) .................. 2007-004607

(51) Int. Cl.
*C08G 77/26* (2006.01)
(52) U.S. Cl.
USPC ............... 528/28; 528/34; 524/762
(58) Field of Classification Search ........ 528/28, 528/34; 524/762
See application file for complete search history.

(56) References Cited

U.S. PATENT DOCUMENTS

| 4,477,625 | A | 10/1984 | Lockhart | |
|---|---|---|---|---|
| 8,003,745 | B2 * | 8/2011 | Bachon et al. | 528/28 |
| 8,008,386 | B2 * | 8/2011 | Yano et al. | 524/167 |
| 2005/0234170 | A1 * | 10/2005 | Ito | 524/306 |

FOREIGN PATENT DOCUMENTS

| GB | 2 137 647 | | 10/1984 |
|---|---|---|---|
| JP | 52-73998 | | 6/1977 |
| JP | 63-6041 | | 1/1988 |
| JP | 5-39428 | | 2/1993 |
| JP | 5-93139 | | 4/1993 |
| JP | 5-117519 | | 5/1993 |
| JP | 5-287190 | | 11/1993 |
| JP | 6-172631 | | 6/1994 |
| JP | 9-12860 | | 1/1997 |
| JP | 2000-313814 | | 11/2000 |
| JP | 2000-345054 | | 12/2000 |
| JP | 2003-206410 | | 7/2003 |
| JP | 2005-248175 | * | 9/2005 |
| WO | 2004/022618 | | 3/2004 |

OTHER PUBLICATIONS

Abstract JP 2005-248175, Sep. 2005.*
English translation of the International Preliminary Report on Patentability issued in International Application No. PCT/JP2007/074626 and mailed Jul. 14, 2009—5 pages.

* cited by examiner

*Primary Examiner* — Margaret Moore
(74) *Attorney, Agent, or Firm* — Hamre, Schumann, Mueller & Larson, P.C.

(57) ABSTRACT

The present invention has its object to provide a curable composition not containing any organotin type curing catalyst of concern because of the toxic feature thereof, or any volatile compound, excellent in curability and storage stability and, further, capable of providing cured products excellent in strength and elongation. The above object can be achieved by a curable composition which includes: an organic polymer (A) containing a hydrolyzable silyl group in a molecule; an amidine compound (B); a plasticizer (C); and an amino group-containing silane coupling agent (D), wherein the amidine compound (B) is preliminarily mixed and dissolved and/or dispersed in the plasticizer (C) and the amino group-containing silane coupling agent (D), and the resultant mixture is added to the reactive silyl group-containing polymer (A).

12 Claims, No Drawings

CURABLE COMPOSITION

TECHNICAL FIELD

The present invention relates to a curable composition comprising one or more organic polymers having a silicon-containing group which has a hydroxyl group or hydrolyzable group bonded to a silicon atom and can form a siloxane bond to be crosslinked (hereinafter referred to also as a "reactive silyl group").

BACKGROUND ART

It is known that organic polymers containing at least one reactive silyl group in the molecule have properties such that they are crosslinked under siloxane bond formation resulting from hydrolysis and other reactions of the reactive silyl group due to moisture and the like, even at room temperature to give rubber-like cured products.

Among these reactive silyl group-containing polymers, those polymers which have a polyoxyalkylene type or polyisobutylene type main chain skeleton are disclosed in Patent Document 1, Patent Document 2 and the like and have already been produced industrially and are in wide use in such fields as sealants, adhesives and coatings.

For obtaining cured products from a curable composition including such reactive silyl group-containing organic polymers, a silanol condensation catalyst is used. Generally used as the silanol condensation catalyst are organotin type catalysts having a carbon-tin bond such as dibutyltin bis(acetylacetonate) and dibutyltin dilaurate. In recent years, however, the toxicity of organotin type compounds have been pointed out and development of non-organotin catalysts has been desired.

Patent Document 3, Patent Document 4, Patent Document 5, Patent Document 6 and Patent Document 7 disclose carboxylic acid tin salts and other carboxylic acid metal salts as silanol condensation catalysts. Patent Documents 3 to 7 further disclose that the addition of an amine compound as a promoter to these catalysts results in improved curability. However, from the viewpoint of reduction in environmental stress, substantially metal-free curing catalysts are desired and, Patent Document 8 discloses the combined use of an amine compound and a carboxylic acid for giving a metal-free silanol condensation catalyst.

It is publicly known that the combined use of an amine compound and other silanol condensation catalysts leads to improved curability. However, when the non-organotin type catalysts described in the patents mentioned above are used, there arises a problem such that the adhesiveness of the cured products obtained is inferior as compared with the use of organotin type catalysts.

There are disclosed almost no examples in which amine compounds are used singly as silanol condensation catalysts. Patent Document 9 discloses a technology which comprises utilizing certain amine compounds known in the art as silanol condensation catalysts and mentions 1,8-diazabicylco[5.4.0]undecene-7 (DBU) and the like as the amine compounds However, when the amine compounds described in Patent Document 9 are used as silanol condensation catalysts of the reactive silyl group-containing organic polymers, some curable compositions exhibit no practical curability. Furthermore, there are certain cases where, although the curable compositions exhibit practical curability, the cured products obtained therefrom are inferior in adhesiveness.

Patent Document 10 discloses a technology which comprises using biguanide compounds, which constitute a group among amine compounds, as silanol condensation catalysts.

However, when the amine compounds described in Patent Document 10 are used as silanol condensation catalysts of the reactive silyl group-containing organic polymers, some curable compositions are inferior in surface curability and depth curability at the early stage of curing.

Patent Document 10 discloses a method in which a biguanide compound (solid at room temperature) is dissolved in a plasticizer or an organic solvent and then added. Upon use of the disclosed plasticizer, there are, however, some cases where amidine compounds are precipitated due to insufficient solubility, or the storage stability of a one-pack type composition is deteriorated due to moisture contained in the plasticizer. There also has been a problem that upon use of the disclosed organic solvent, volatilization of the organic solvent brings about pollution of the work environment.

Patent Document 1: Japanese Kokai Publication S52-73998
Patent Document 2: Japanese Kokai Publication S63-6041
Patent Document 3: Japanese Kokai Publication H05-39428
Patent Document 4: Japanese Kokai Publication H09-12860
Patent Document 5: Japanese Kokai Publication 2000-313814
Patent Document 6: Japanese Kokai Publication 2000-345054
Patent Document 7: Japanese Kokai Publication 2003-206410
Patent Document 8: Japanese Kokai Publication H05-117519
Patent Document 9: WO2004/022618
Patent Document 10: Japanese Kokai Publication 2005-248175

SUMMARY OF THE INVENTION

It is an object of the present invention to provide a curable composition which includes a reactive silyl group-containing organic polymer, does not contain, as a silanol condensation catalyst, any organotin type curing catalyst currently of concern because of the toxic feature thereof, or any volatile compound, is excellent in curability and storage stability and, further, can provide cured products excellent in strength and elongation.

As a result of intensive investigations made by the present inventors to solve such problems as mentioned above, the inventors have found the following and have completed the present invention.

An amidine compound having a specific structure acts effectively as a curing catalyst of a reactive silyl group-containing organic polymer, and the amidine compound can therefore be substituted for an organotin type curing catalyst.

In dissolving the above-mentioned amidine compound having the specific structure, it is effective to use a propylene glycol compound and also to use an amino group-containing silane coupling agent in combination therewith.

Of the above-mentioned propylene glycol compounds, a compound having a structure of (poly)propylene glycol monoalkyl ether specifically has high solubility of the amidine compound therein.

It is possible to control generation of VOC by selecting, as the propylene glycol compound, a compound having a boiling point of not lower than 200° C. at 760 mmHg, and consequently to maintain a good work environment even upon use of the curable composition in a room.

Blending of the silane coupling agent having an amino group makes it possible to remove moisture contained in the mixture which includes the amidine compound and the propylene glycol compound, and a curable composition obtained by mixing the above mixture with a silyl group-containing organic polymer inhibits a rise in viscosity during storage, and enables a long-term use thereof.

These findings also solve the following problems, as well as the above-mentioned problems.

The curable composition including a reactive silyl group-containing organic polymer is primarily employed as a one-pack type moisture-curable composition.

The one-pack type moisture-curable composition used herein is obtained by mixing a reactive silyl group-containing organic polymer with a filler, a plasticizer and the like, heating the mixture and/or reducing the pressure thereon so as to remove moisture contained in the mixture, thereafter adding a silane coupling agent and a curing catalyst thereto, and putting the mixture obtained into an airtight container. When the one-pack type moisture-curable composition is taken out from the container upon use thereof, curing is initiated by reaction with moisture in the air.

However, even when specific amidine compounds used in the present invention, which are solid at room temperature, are added in the form of fine powder to the curable composition, the powder thereof is agglomerated and not sufficiently dispersed so that the amidine compounds are more likely to remain, in a small mass, in the curable composition. Such a mass is more likely to cause a problem that the cured products obtained may be inferior in tensile properties such as strength and elongation at break. That is, the properties of the cured products obtained depend on the dissolved state and dissolving procedure of amidine compounds. However, since it is difficult to suitably characterize the present invention based on how amidine compounds are present, there may be no alternative but to characterize the present invention based on the preparation procedure though it is a composition invention.

That is, the present invention relates to the following (I) to (XI):

(I). A curable composition which comprises:

100 parts by weight of an organic polymer (A) containing, in a molecule, a reactive silyl group represented by the formula: $-SiR^1{}_nX^1{}_{3-n}$ (wherein the n $R^1$ groups each represent at least one member selected from the group consisting of $C_{1-20}$ alkyl groups, $C_{6-20}$ aryl groups and $C_{7-20}$ aralkyl groups, and the (3-n) $X^1$s are each independently either a hydroxyl group or a hydrolyzable group);

0.1 to 30 parts by weight of an amidine compound (B) represented by the formula (1):

$$R^2N=CR^3-NR^4{}_2 \quad (1)$$

(wherein $R^2$, $R^3$, and the two $R^4$s are each independently a hydrogen atom or an organic group);

0.1 to 100 parts by weight of a plasticizer (C); and 0.1 to 20 parts by weight of an amino group-containing silane coupling agent (D), wherein the amidine compound (B) is preliminarily dissolved and/or dispersed in the plasticizer (C) and the silane coupling agent (D) containing an amino group in a molecule, and the resultant mixture is mixed in the reactive silyl group-containing organic polymer (A).

(II). The curable composition according to (I), wherein the plasticizer (C) is a propylene glycol compound.

(III). The curable composition according to (I) or (II), wherein the main chain skeleton of the reactive silyl group-containing organic polymer (A) is a polyoxyalkylene and/or (meth)acrylate ester polymer.

(IV). The curable composition according to any one of (I) to (III), wherein the amidine compound represented by the formula (1) is a guanidine compound in which $R^3$ in the formula (1) is an organic group represented by $-NR^5{}_2$ (wherein the two $R^5$s are each independently an organic group).

(V). The curable composition according to any one of (I) to (IV), wherein the amidine compound (B) contains an aryl group in a molecule.

(VI). The curable composition according to any one of (I) to (V), wherein the plasticizer (C) has a boiling point of not lower than 200° C. at 760 mmHg.

(VII). The curable composition according to any one of (I) to (VI), wherein the plasticizer (C) is (poly)propylene glycol alkyl ether.

(VIII). The curable composition according to any one of Claims (I) to (VII), wherein the plasticizer (C) is tripropylene glycol monobutyl ether.

(IX). The curable composition according to any one of Claims (I) to (VIII), wherein 3 to 100% by weight of the reactive silyl group contained in one molecule of the organic polymer (A) is a silyl group represented by the formula: $-SiX^1{}_3$ (wherein the $X^1$s are each independently either a hydroxyl group or a hydrolyzable group).

(X). A sealant which comprises the curable composition according to any one of (I) to (IX).

(XI). An adhesive which comprises the curable composition according to any one of (I) to (IX).

The curable composition of the invention contains neither any organotin type compound that is currently of concern because of the toxic feature thereof nor any low volatile component that is a VOC generation source, and therefore is superior in environmental compatibility. Improvement of the solubility of a curing catalyst composed of the basic compound that conventionally has difficulty in its uniform dispersion into a composition makes it possible to uniformly disperse the curing catalyst into a composition, with the result that the cured products obtained have a smooth surface and excel in strength and elongation. Also, a one-pack type curable composition according to the invention has no viscosity rise even after storage, which allows for a favorable long-term use. When the one-pack type curable composition is taken out from a hermetically packed container, it reacts with moisture in the air and exhibits good curability.

BEST MODE FOR CARRYING OUT THE INVENTION

In the following, the present invention is described in detail.

The curable composition of the invention includes, as an essential constituent, a reactive silyl group-containing organic polymer (A).

The organic polymer (A) has, on an average, at least one reactive silyl group per molecule. The reactive silyl group, so referred to herein, is an organic group containing a hydroxyl group or hydrolyzable group each bound to a silicon atom. The reactive silyl group-containing organic polymer (A) is crosslinked under siloxane bond formation as a result of a reaction promoted by a silanol condensation catalyst.

There may be mentioned a group represented by the formula (2) as the reactive silyl group:

$$-SiR^1{}_nX^1{}_{3-n} \quad (2)$$

(wherein the n $R^1$ groups each represent at least one member selected from the group consisting of $C_{1-20}$ alkyl groups, $C_{6-20}$ aryl groups and $C_{7-20}$ aralkyl groups, and the (3-n) $X^1$s are each independently either a hydroxyl group or a hydrolyzable group)

The curable composition of the present invention, which includes a reactive silyl group-containing organic polymer (A) as the main component, is better in compatibility with a curing catalyst, namely the amidine compound (B), as compared with a composition which includes, as the main component, such an inorganic polymer as polydimethylsiloxane. The curable composition is hence excellent in curability and adhesiveness.

Further, for the same reasons, the organic polymer (A) preferably has a main chain skeleton containing at least one atom selected from among a hydrogen atom, a carbon atom, a nitrogen atom, an oxygen atom and a sulfur atom.

The main chain skeleton of the organic polymer (A) is not particularly restricted but includes, polyoxyalkylene type polymers such as polyoxyethylene, polyoxypropylene, polyoxybutylene, polyoxytetramethylene, polyoxyethylene-polyoxypropylene copolymers and polyoxypropylene-polyoxybutylene copolymers; hydrocarbon type polymers such as ethylene-propylene type copolymers, polyisobutylene, copolymers of isobutylene and isoprene or the like, polychloroprene, polyisoprene, copolymers of isoprene or butadiene and acrylonitrile and/or styrene or the like, polybutadiene and copolymers of isoprene or butadiene and acrylonitrile and styrene or the like, and hydrogenated polyolefin polymers derived from these polyolefin type polymers by hydrogenation; polyester type polymers obtained by condensation of a dibasic acid such as adipic acid and a glycol, or ring-opening polymerization of a lactone(s); (meth)acrylate ester polymers obtained by radical polymerization of such a compound as ethyl(meth)acrylate and butyl(meth)acrylate; vinyl polymers obtained by radical polymerization of such a compound as a (meth)acrylate ester compound, vinyl acetate, acrylonitrile and styrene; graft polymers obtained by polymerizing a vinyl compound in such polymers as mentioned above; polysulfide type polymers; polyamide type polymers such as polyamide 6 produced by ring-opening polymerization of ε-caprolactam, polyamide 6·6 produced by polycondensation of hexamethylenediamine and adipic acid, polyamide 6·10 produced by polycondensation of hexamethylenediamine and sebacic acid, polyamide 11 produced by polycondensation of ε-aminoundecanoic acid, polyamide 12 produced by ring-opening polymerization of ε-aminolaurolactam, and copolymer polyamides composed of a plurality of the polyamides mentioned above; polycarbonate type polymers such as polycarbonates produced by polycondensation of bisphenol A and carbonyl chloride; diallyl phthalate type polymers; and like organic polymers. Another example thereof is polysiloxane type polymers such as polydiorganosiloxane.

Preferred among those mentioned above are organic polymers (A) having, as the main chain skeleton, saturated hydrocarbon type polymers such as polyisobutylene, hydrogenated polyisoprene and hydrogenated polybutadiene, polyoxyalkylene type polymers, (meth)acrylate ester polymers and polysiloxane type polymers, in view of their relatively low glass transition temperature and of good low-temperature resistance of cured products obtained therefrom.

The glass transition temperature of the reactive silyl group-containing organic polymer (A) is not particularly restricted but preferably is not higher than 20° C., more preferably not higher than 0° C., particularly preferably not higher than −20° C. When the glass transition temperature is higher than 20° C., the viscosity of the curable composition increases in the winter season or in cold districts, developing a tendency toward lowered workability and, further, the flexibility of cured products obtained decreases and the elongation thereof tends to decrease.

The glass transition temperature mentioned above can be determined by DSC measurement according to the method prescribed in JIS K 7121.

A curable composition including, as the main component, an organic polymer whose main chain skeleton is a saturated hydrocarbon type polymer, a polyoxyalkylene type polymer or a (meth)acrylate ester polymer is more preferred since, when it is used as an adhesive or sealant, low-molecular-weight components scarcely migrate to (i.e. stain) adherends.

Further, an organic polymer whose main chain skeleton is a polyoxyalkylene type polymer or a (meth)acrylate ester polymer is particularly preferred since it is high in moisture permeability and, when used as a main component of a one-pack type adhesive or sealant, it is excellent in depth curability and gives cured products excellent in adhesiveness. Most preferred is an organic polymer whose main chain skeleton is a polyoxyalkylene type polymer.

The polyoxyalkylene type polymer to be used as the main chain skeleton of the organic polymer (A) is a polymer having a repeating unit represented by the formula (3):

$$—R^8—O—\quad\quad\quad(3)$$

($R^8$ is a straight or branched alkylene group containing 1 to 14 carbon atoms).

The group $R^8$ in the formula (3) is not particularly restricted provided that it is one of the straight or branched alkylene groups containing 1 to 14 carbon atoms and, among those, straight or branched alkylene groups containing 2 to 4 carbon atoms are preferred.

The repeating unit defined by the formula (3) is not particularly restricted but includes, for example, —CH$_2$O—, —CH$_2$CH$_2$O—, —CH$_2$CH(CH$_3$)O—, —CH$_2$CH(C$_2$H$_5$)O—, —CH$_2$C(CH$_3$)$_2$O— and —CH$_2$CH$_2$CH$_2$CH$_2$O—. 

The polyoxyalkylene type polymer may have one repeating unit species or a plurality of repeating unit species. In the case of use in the field of sealants and the like, in particular, an organic polymer (A) in which the main component of the main chain skeleton is a propylene oxide polymer is preferred since such polymer is noncrystalline and relatively low in viscosity.

A method of producing such a polyoxyalkylene type polymer is not particularly restricted but may be any of the methods known in the art. For example, mention may be made of the method using an alkali catalyst such as KOH, the method disclosed in Japanese Kokai Publication S61-215623 which uses, as a catalyst, a metal compound-porphyrin complex, such as a complex obtained by reacting an organoaluminum compound with porphyrin, the methods disclosed in Japanese Kokoku Publications S46-27250 and S59-15336 and U.S. Pat. Nos. 3,278,457, 3,278,458, 3,278,459, 3,427,256, 3,427,334 and 3,427,335, among others, which use, as a catalyst, a double metal cyanide complex, the method disclosed in Japanese Kokai Publication H10-273512 which uses, as a catalyst, a polyphosphazene salt, and the method disclosed in Japanese Kokai Publication H11-060722 which uses, as a catalyst, a phosphazene compound.

A method of producing a reactive silyl group-containing polyoxyalkylene type polymer is not particularly restricted but may be any of the methods known in the art. For example, mention may be made of the methods disclosed in Japanese Kokoku Publications S45-36319 and S46-12154, Japanese Kokai Publications S50-156599, S54-6096, S55-13767, S55-13468 and S57-164123, Japanese Kokoku Publication H03-2450 and U.S. Pat. Nos. 3,632,557, 4,345,053, 4,366,307 and 4,960,844, among others, and the methods disclosed in Japanese Kokai Publications S61-197631, S61-215622, S61-215623, S61-218632, H03-72527, H03-47825 and H08-231707, among others, according to which polymers high in molecular weight (number average molecular weight of 6,000 or higher) and narrow in molecular weight distribution (Mw/Mn of 1.6 or below) can be obtained.

In formulating the curable composition using the reactive silyl group-containing polyoxyalkylene type polymer mentioned above, the polymer may include a single species or a combination of a plurality of species thereof.

The saturated hydrocarbon type polymer to be used as the main chain skeleton of the organic polymer (A) is a polymer whose molecules are substantially free of any carbon-carbon unsaturated bond, except for an aromatic ring, and is excellent in heat resistance, weather resistance, durability and a moisture barrier property.

The saturated hydrocarbon type polymer is not particularly restricted but there may be mentioned (1) polymers derived from an olefin type compound containing 2 to 6 carbon atoms, such as ethylene, propylene, 1-butene and isobutylene as the repeating unit species, (2) polymers derived from a diene type compound such as butadiene and isoprene as the repeating unit species, and (3) polymers obtained by copolymerizing the above-mentioned diene type compound and the above-mentioned olefin type compound, followed by hydrogenation and the like. Among these, isobutylene type polymers and hydrogenated polybutadiene type polymers are preferred in view of ease of functional-group introduction into an end thereof, ease of molecular weight control and adjustability of the number of terminal functional groups, among others; isobutylene type polymers are more preferred.

The isobutylene type polymer may be such one that all of the repeating units are derived from isobutylene or a copolymer with another compound. When the isobutylene type copolymer is used as the main chain skeleton, the polymer preferably has an isobutylene-derived repeating unit content, in each molecule, of not lower than 50% by weight, more preferably not lower than 80% by weight, particularly preferably 90 to 99% by weight, so that the cured products obtained may have excellent rubber properties.

A method of producing the saturated hydrocarbon type polymer is not particularly restricted but may be any of various conventional polymerization methods. Among them, the living polymerization method the development of which has been remarkable in recent years is preferred and, for example, the Inifer polymerization found by Kennedy et al. (J. P. Kennedy et al., J. Polymer Sci., Polymer Chem. Ed., 1997, 15, p. 2843) may be mentioned as a method of producing isobutylene-based polymers using the living polymerization method. This polymerization method enables introduction of various functional groups into molecular ends and the isobutylene type polymers obtained are known to have a molecular weight of about 500 to 100,000 with a molecular weight distribution of not broader than 1.5.

A method of producing a reactive silyl group-containing saturated hydrocarbon type polymer is not particularly restricted but may be any of the methods known in the art, for example the methods disclosed in Japanese Kokoku Publications H04-69659 and H07-108928, Japanese Kokai Publications S63-254149, S64-22904 and H01-197509 and Japanese Patents Nos. 2539445 and 2873395 and Japanese Kokai Publication H07-53882.

In formulating the curable composition using the above-mentioned reactive silyl group-containing saturated hydrocarbon type polymer, the polymer may include a single species or a combination of a plurality of species thereof.

A (meth)acrylate ester polymer to be used as the main chain skeleton of the organic polymer (A) is a polymer in which the repeating unit is derived from a (meth)acrylate ester compound. The expression "(meth)acrylate ester" refers to an acrylate ester and/or a methacrylate ester and has the same meaning also in the description which follows.

The (meth)acrylate ester compound to be used as the repeating unit is not particularly restricted but includes such (meth)acrylate compounds as (meth)acrylic acid, methyl (meth)acrylate, ethyl(meth)acrylate, n-propyl(meth)acrylate, isopropyl(meth)acrylate, n-butyl(meth)acrylate, isobutyl (meth)acrylate, tert-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl (meth)acrylate, nonyl(meth)acrylate, decyl(meth)acrylate, dodecyl(meth)acrylate, phenyl(meth)acrylate, toluyl(meth)acrylate, benzyl(meth)acrylate, 2-methoxyethyl(meth)acrylate, 3-methoxybutyl(meth)acrylate, 2-hydroxyethyl(meth)acrylate, 2-hydroxypropyl(meth)acrylate, stearyl(meth)acrylate, glycidyl(meth)acrylate, γ-(methacryloyloxypropyl)trimethoxysilane, γ-(methacryloyloxypropyl)dimethoxymethylsilane, (meth)acrylic acid-ethylene oxide adducts, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, perfluoroethyl(meth)acrylate, trifluoromethyl(meth)acrylate, bis(trifluoromethyl)methyl(meth)acrylate, 2-trifluoromethyl-2-perfluoroethylethyl(meth)acrylate, 2-perfluorohexylethyl(meth)acrylate, 2-perfluorodecylethyl(meth)acrylate and 2-perfluorohexadecylethyl(meth)acrylate.

The (meth)acrylate ester polymer includes copolymers of a (meth)acrylate ester compound and a vinyl compound copolymerizable therewith. The vinyl compound is not particularly restricted but includes: styrene compounds such as styrene, vinyltoluene, α-methylstyrene, chlorostyrene, and styrenesulfonic acid and salts thereof; silyl group-containing vinyl compounds such as vinyltrimethoxysilane and vinyltriethoxysilane; maleic acid, maleic anhydride, and maleic acid monoalkyl esters and dialkyl esters; fumaric acid and fumaric acid monoalkyl esters and dialkyl esters; maleimide type compounds such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile group-containing vinyl compounds such as acrylonitrile and methacrylonitrile; amide group-containing vinyl compounds such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride and allyl alcohol. It is also possible to use a plurality of these as copolymerization components.

Among the (meth)acrylate ester polymers obtained from the compounds mentioned above, those organic polymers which include, as the main chain skeleton, a copolymer of a styrene compound and a (meth)acrylate compound are preferred since they give cured products excellent in physical properties; those organic polymers (A) which include, as the main chain skeleton, a copolymer of an acrylate ester compound and a methacrylate ester compound are more preferred, and those organic polymers (A) which include, as the main chain skeleton, a polymer of an acrylate ester compound are particularly preferred.

For use in general architectural fields, the curable composition is required to be low in viscosity, while the cured products obtained therefrom are required to be low in modulus and high in elongation, weather resistance and thermal stability.

More preferred as ones meeting these requirements are organic polymers (A) whose main chain skeleton is derived from a butyl acrylate compound.

On the other hand, for use in automotive or like fields, the cured products obtained are required to be excellent in oil resistance.

More preferred as one giving cured products excellent in oil resistance is an organic polymer (A) whose main chain skeleton is a copolymer mainly derived from ethyl acrylate.

Curable compositions including the organic polymer (A) whose main chain skeleton is an ethyl acrylate-based copolymer tend to give cured products somewhat inferior in low-temperature properties (low-temperature resistance) in spite of their being excellent in oil resistance. For improving the low-temperature properties, replacement is made of a part of ethyl acrylate with butyl acrylate. Since, however, an increased proportion of butyl acrylate tends to impair the good oil resistance, the proportion thereof is preferably not higher than 40%, and more preferably not higher than 30%, in cases of a field where oil resistance is required.

The use, as a comonomer component, of 2-methoxyethyl acrylate, 2-ethoxyethyl acrylate, or the like which has an oxygen atom introduced into the side chain alkyl group is also preferred for improving low-temperature properties and the like without causing decrease in oil resistance.

Since, however, the introduction of an alkoxy group having an ether bond in the side chain tends to render the cured products obtained inferior in thermal stability, the proportion thereof is preferably not higher than 40% in cases of use where thermal stability is required.

As mentioned above, it is possible to obtain an organic polymer (A) whose main chain skeleton is an ethyl acrylate-based copolymer and which is suited for various uses or can meet requirements by selecting the comonomer component species and varying the proportion thereof taking into consideration such physical properties as oil resistance, thermal stability and low temperature properties as required of the cured products obtained. For example, there may be mentioned, without any limitative meaning, copolymers of ethyl acrylate, butyl acrylate and 2-methoxyethyl acrylate (weight ratio: 40-50/20-30/30-20) as examples excellent in balance among such physical properties as oil resistance, thermal stability and low-temperature properties.

In the practice of the present invention, these preferred compounds may be copolymerized or, further, block-copolymerized with another compound and, on such occasion, the content of these preferred compounds is preferably not lower than 40% by weight.

A method of producing the (meth)acrylate ester polymer is not particularly restricted but may be any of the methods known in the art. Among them, the living radical polymerization method is preferably used in particular in view of the ease of high-rate introduction of a crosslinking functional group into a molecular chain end and the capability of obtaining polymers narrow in molecular weight distribution and low in viscosity.

The polymers obtained by ordinary free radical polymerization using, for example, an azo compound or peroxide as a polymerization initiator tend to show an increased molecular weight distribution value generally not lower than 2 and an increased level of viscosity.

Among the methods of producing (meth)acrylate ester polymers using the above-mentioned "living radical polymerization method", the "atom transfer radical polymerization method" which uses an organic halide or sulfonyl halide compound as an initiator and a transition metal complex as a catalyst is preferred as the method of producing (meth)acrylate ester polymers containing a specific functional group since it has not only such properties of the "living radical polymerization" as the capability to give polymers narrow in molecular weight distribution and low in viscosity but also a high degree of freedom in selecting the initiator and catalyst and the capability to provide the polymers with a halogen or the like at ends thereof relatively advantageous to functional-group exchange reactions. As for the atom transfer radical polymerization method, there may be mentioned, for example, the method described in Matyjaszewski et al., Journal of the American Chemical Society (J. Am. Chem. Soc.), 1995, 117, p. 5614.

A method of producing a reactive silyl group-containing (meth)acrylate ester polymer is not particularly restricted but includes, for example, the free radical polymerization method using a chain transfer agent, as disclosed in Japanese Kokoku Publications H03-14068 and H04-55444 and Japanese Kokai Publication H06-211922, the atom transfer radical polymerization method as disclosed in Japanese Kokai Publication H09-272714, and the like.

It is also possible to use a (meth)acrylate ester copolymer derived from a plurality of the (meth)acrylate ester compounds mentioned above as the main chain skeleton of the organic polymer (A).

As typical examples of the (meth)acrylate ester copolymer derived from a plurality of (meth)acrylate ester compounds, there may be mentioned copolymers whose main chain skeleton substantially includes: a repeating unit having an alkyl group containing 1 to 8 carbon atoms as represented by the formula (4):

$—CH_2—C(R^9)(COOR^{10})—$ (4)

($R^9$ is a hydrogen atom or a methyl group and $R^{10}$ is an alkyl group containing 1 to 8 carbon atoms); and a repeating unit having an alkyl group containing 9 or more carbon atoms as represented by the formula (5):

$—CH_2—C(R^9)(COOR^{11})—$ (5)

($R^9$ is as defined above referring to the formula (4) and $R^{11}$ is an alkyl group containing 9 or more carbon atoms).

The group $R^{10}$ in the formula (4) is not particularly restricted provided that it is one of the alkyl groups containing 1 to 8 carbon atoms; for example, there may be mentioned a methyl group, an ethyl group, a propyl group, an n-butyl group, a t-butyl group and a 2-ethylhexyl group.

Among these, alkyl groups containing 1 to 4 carbon atoms are preferred. The group $R^{10}$ contained in the copolymers is not always restricted to a single alkyl group species.

The group $R^{11}$ in the formula (5) is not particularly restricted provided that it is one of the alkyl groups containing 9 or more carbon atoms; for example, there may be mentioned a lauryl group, a tridecyl group, a cetyl group, a stearyl group and a behenyl group. Among these, alkyl groups containing 10 to 30 carbon atoms are preferred and long-chain alkyl groups containing 10 to 20 carbon atoms are more preferred. The group $R^{11}$ contained in the copolymers is not always restricted to a single alkyl group species.

The (meth)acrylate ester copolymer substantially includes the repeating units defined by the formula (4) and formula (5). The term "substantially" as used herein means that the total content of the repeating units defined by the formulas (4) and (5) in the copolymer is in excess of 50% by weight, and the total content of the repeating units defined by the formulas (4) and (5) in the copolymer is preferably not lower than 70% by weight.

The content ratio between the repeating units of formulas (4) and (5) occurring in the copolymer as expressed in terms of the weight ratio (formula (4):formula (5)) is preferably 95:5 to 40:60, and more preferably 90:10 to 60:40.

The (meth)acrylate ester copolymer includes a copolymer of (meth)acrylate ester compounds used as the repeating units defined by the formulas (4) and (5) and a vinyl compound copolymerizable therewith.

As the vinyl compound, there may be mentioned, for example, acrylic acids such as acrylic acid and methacrylic acid; amide group-containing compounds such as acrylamide, methacrylamide, N-methylolacrylamide and N-methylolmethacrylamide, epoxy group-containing compounds such as glycidyl acrylate and glycidyl methacrylate, amino group-containing compounds such as diethylaminoethyl acrylate, diethylaminoethyl methacrylate and aminoethyl vinyl ether; and, further, such compounds as acrylonitrile, styrene, α-methylstyrene, alkyl vinyl ethers, vinyl chloride, vinyl acetate, vinyl propionate and ethylene.

In the main chain skeleton of the organic polymer (A), there may further be present, if necessary, another repeating unit containing, for example, a urethane bond, so long as the effects of the present invention are not significantly lessened thereby.

The urethane bond-containing repeating unit is not particularly restricted but there may be mentioned, for example, a repeating unit including a group formed by the reaction between an isocyanate group and an active hydrogen group (the group thus formed is hereinafter referred to also as an "amide segment").

The amide segment is an organic group represented by the formula (6):

$$-NR^{12}C(=O)- \quad (6)$$

($R^{12}$ is a hydrogen atom or an organic group).

The amide segment is not particularly restricted but includes, for example, a urethane group formed by the reaction between an isocyanate group and a hydroxyl group; a urea group formed by the reaction between an isocyanate group and an amino group; and a thiourethane group formed by the reaction between an isocyanate group and a mercapto group.

Those organic groups formed by the reaction of an active hydrogen in the urethane group, the urea group and the thiourethane group with an isocyanate group also fall within the definition of "amide segment" as given herein.

A method of producing a reactive silyl group-containing organic polymer containing the amide segment in the main chain skeleton thereof is not particularly restricted but there may be mentioned, for example, the method comprising reacting an active hydrogen-terminated organic group-containing organic polymer with an excess of a polyisocyanate compound to give a polymer having an isocyanate group at a polyurethane type main chain end and, thereafter or simultaneously therewith, reacting all or part of the isocyanate groups in the polymer with a group W in a silicon compound represented by the formula (7):

($R^{13}$ is a divalent organic group, more preferably a divalent hydrocarbon group containing 1 to 20 carbon atoms; $R^{14}$ is a hydrogen atom or organic group, $X^3$ is a hydroxyl group or hydrolyzable group, and a is an integer of 1 to 3; and W is a group containing at least one active hydrogen selected from the group consisting of a hydroxyl group, a carboxyl group, a mercapto group and an amino (primary or secondary) group), as disclosed in Japanese Kokoku Publication S46-12154 (U.S. Pat. No. 3,632,557), Japanese Kokai Publications S58-109529 (U.S. Pat. No. 4,374,237), S62-13430 (U.S. Pat. No. 4,645,816), H08-53528 (EP 0676403), and H10-204144 (EP 0831108), Japanese Kohyo Publication 2003-508561 (U.S. Pat. No. 6,197,912), Japanese Kokai Publications H06-211879 (U.S. Pat. No. 5,364,955), H10-53637 (U.S. Pat. No. 5,756,751), H11-100427, 2000-169544, 2000-169545 and 2002-212415, Japanese Patent 3,313,360, U.S. Pat. Nos. 4,067,844 and 3,711,445, Japanese Kokai Publication 2001-323040, and the like.

Mention may also be made of the method comprising reacting an active hydrogen-containing group occurring at an end of an organic polymer with the isocyanate group of a reactive silyl group-containing isocyanate compound represented by the formula (8):

($R^{13}$, the $R^{14}$ groups, the $X^3$ groups, and a are as defined above referring to the formula (7)), as disclosed in Japanese Kokai Publications H11-279249 (U.S. Pat. No. 5,990,257), 2000-119365 (U.S. Pat. No. 6,046,270), S58-29818 (U.S. Pat. No. 4,345,053), H03-47825 (U.S. Pat. No. 5,068,304), H11-60724, 2002-155145 and 2002-249538, WO 03/018658, WO 03/059981, and the like.

The active hydrogen-terminated group-containing organic polymer is not particularly restricted but includes, for example, hydroxyl group-terminated oxyalkylene polymers (polyether polyols), polyacrylic polyols, polyester polyols, hydroxyl group-terminated saturated hydrocarbon type polymers (polyolefin polyols), polythiol compounds and polyamine compounds.

Preferred among these are those organic polymers whose main chain skeleton includes a polyether polyol, polyacrylic polyol or polyolefin polyol component, since they have a relatively low glass transition temperature and give cured products excellent in low-temperature resistance.

Those organic polymers including a polyether polyol component are low in viscosity, have good workability and give cured products showing good depth curability and adhesiveness, hence are particularly preferred. Curable compositions which includes an organic polymer containing a polyacrylic polyol or saturated hydrocarbon type polymer component are more preferred since they give cured products having good weather resistance and thermal stability.

The polyether polyol preferably has, on an average, at least 0.7 terminal hydroxyl group per molecule.

The production method thereof is not particularly restricted but may be any of the methods known in the art, including, for example, a polymerization method using an alkali metal catalyst, and a polymerization method of an alkylene oxide using a polyhydroxy compound containing at least two hydroxyl groups per molecule as an initiator in the presence of a double metal cyanide complex or cesium.

Among the polymerization methods mentioned above, the polymerization method using a double metal cyanide complex is preferred since it gives polymers low in degree of unsaturation, narrow in molecular weight distribution (Mw/Mn) and low in viscosity, which give cured products excellent in acid resistance and weather resistance, among others.

The term "polyacrylic polyol" refers to a polyol whose skeleton is a (meth)acrylic acid alkyl ester (co)polymer and whose molecule contains a hydroxyl group.

As for the production method thereof, the living radical polymerization method is preferred and the atom transfer radical polymerization method is more preferred because of capability of their giving polymers narrow in molecular weight distribution and possibly low in viscosity. Also preferred is the polymerization method involving the so-called SGO process in which an acrylic acid alkyl ester type compound is continuously bulk-polymerized under high-temperature and high-pressure conditions, as disclosed in Japanese Kokai Publication 2001-207157. As such a polyacrylic polyol, there may be mentioned ARUFON UH-2000 (product of Toagosei Co., Ltd.), and the like.

The polyisocyanate compound is not particularly restricted but includes, for example, an aromatic type polyisocyanate such as toluene (tolylene)diisocyanate, diphenylmethane diisocyanate and xylylene diisocyanate; and an aliphatic type polyisocyanate such as isophorone diisocyanate and hexamethylene diisocyanate.

The silicon compound defined by the formula (7) is not particularly restricted but there may be mentioned, for example, amino group-containing silane compounds such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane and N-phenylaminomethyltrimethoxysilane; hydroxyl group-containing silane compounds such as γ-hydroxypropyltrimethoxysilane; and mercapto group-containing silane compounds such as γ-mercaptopropyltrimethoxysilane.

As the silicon compound represented by the formula (7), there may further be mentioned Michael addition products derived from various α,β-unsaturated carbonyl compounds and a primary amino group-containing silane compound or Michael addition products derived from various (meth)acryloyl group-containing silane compounds and a primary amino group-containing compound, as disclosed in Japanese Kokai Publications H06-211879 (U.S. Pat. No. 5,364,955), H10-53637 (U.S. Pat. No. 5,756,751), H10-204144 (EP 0831108), 2000-169544 and 2000-169545.

The reactive silyl group-containing isocyanate compound defined by the formula (8) is not particularly restricted but includes, for example, γ-trimethoxysilylpropyl isocyanate, γ-triethoxysilylpropyl isocyanate, γ-methyldimethoxysilylpropyl isocyanate, γ-methyldiethoxysilylpropyl isocyanate, trimethoxysilylmethyl isocyanate, triethoxymethylsilylmethyl isocyanate, dimethoxymethylsilylmethyl isocyanate and diethoxymethylsilylmethyl isocyanate.

As the reactive silyl group-containing isocyanate compound defined by the formula (8), there may further be mentioned the reaction products derived from a silicon compound of the formula (7) and an excess of a polyisocyanate compound, as disclosed in Japanese Kokai Publication 2000-119365 (U.S. Pat. No. 6,046,270).

The hydrolyzable group represented by $X^1$ in the formula (2) is not particularly restricted but includes those hydrolyzable groups which are known in the art, for example, a hydrogen atom, halogen atoms, and an alkoxy group, an acyloxy group, a ketoxymate group, an amino group, an amide group, an acid amide group, an aminooxy group, a mercapto group and an alkenyloxy group. Among these, a hydrogen atom, an alkoxy group, an acyloxy group, a ketoxymate group, an amino group, an amide group, an aminooxy group, a mercapto group and an alkenyloxy group are preferred, and an alkoxy group is more preferred from the viewpoints of mild hydrolyzability and easy handleability.

One silicon atom can have one to three groups selected from a hydrolyzable group or a hydroxyl group bound thereto. When the silicon atom in the reactive silyl group has two or more groups selected from a hydrolyzable group or a hydroxyl group bound thereto, these groups may be the same group or may be different groups.

The group $R^1$ in the formula (2) is not particularly restricted but includes, for example, an alkyl group such as a methyl group and an ethyl group, a cycloalkyl group such as a cyclohexyl group, an aryl group such as a phenyl group, and an aralkyl group such as a benzyl group. Among these, a methyl group is preferred.

The reactive silyl group defined by the formula (2) is not particularly restricted but includes, for example, a trimethoxysilyl group, a triethoxysilyl group, a triisopropoxysilyl group, a dimethoxymethylsilyl group, a diethoxymethylsilyl group, a diisopropoxymethylsilyl group, a methoxydimethylsilyl group and an ethoxydimethylsilyl group. Among these, a trimethoxysilyl group, a triethoxysilyl group and a dimethoxymethylsilyl group are preferred since they have high activity and afford good curability, and a trimethoxysilyl group is more preferred.

Further, a dimethoxymethylsilyl group is particularly preferred because of good curability and storage stability of the curable composition obtained. A triethoxysilyl group is also particularly preferred since the alcohol formed upon hydrolysis reaction of the reactive silyl group is highly safe ethanol.

A method of introducing the reactive silyl group is not particularly restricted but includes such methods known in the art as the methods (a) to (c) shown below.

(a) A method comprising: reacting a polymer containing such a functional group as a hydroxyl group in the molecule with an organic compound containing an active group reactive with this functional group as well as an unsaturated group to give an unsaturated group-containing polymer; or copolymerizing a polymer containing such a functional group as a hydroxyl group in the molecule with an unsaturated group-containing epoxy compound to give an unsaturated group-containing polymer, and then reacting the reaction product obtained with a reactive silyl group-containing hydrosilane for hydrosilylation.

(b) A method comprising reacting the unsaturated group-containing organic polymer obtained in the same manner as described above in (a) with a compound containing a mercapto group and a reactive silyl group.

(c) A method comprising reacting an organic polymer containing such a functional group as a hydroxyl group, an epoxy group or an isocyanate group in the molecule with a compound containing a functional group reactive with said function group and a reactive silyl group.

Among these methods, the method (a) or the method (c) in such a mode that a hydroxyl group-terminated polymer is reacted with a compound containing an isocyanate group and a reactive silyl group is preferred in view of the fact that a high conversion rate can be attained in a relatively short period of time. The method (a) is more preferred since curable compositions based on the reactive silyl group-containing organic polymer obtained by the method (a) tend to be lower in viscosity than curable compositions based on the organic polymer obtained by the method (c) and, as a result, curable compositions having good workability can be obtained and, further, the organic polymer obtained by the method (b) has a stronger mercaptosilane-derived odor as compared with the organic polymer obtained by the method (a).

The hydrosilane compound to be used in carrying out the method (a) is not particularly restricted but includes, for example, halogenated hydrosilanes such as trichlorosilane, methyldichlorosilane, dimethylchlorosilane and phenyldichlorosilane; alkoxysilanes such as trimethoxysilane, triethoxysilane, methyldiethoxysilane, methyldimethoxysilane, phenyldimethoxysilane and 1-[2-(trimethoxysilyl)ethyl]-1,1,3,3-tetramethyldisiloxane; acyloxyhydrosilanes such as methyldiacetoxysilane and phenyldiacetoxysilane; and ketoxymatehydrosilanes such as bis(dimethylketoxymate)methylsilane and bis(cyclohexylketoxymate)methylsilane. Among these, halogenated hydrosilanes and alkoxyhydrosilanes are preferred, and alkoxyhydrosilanes are more preferred because of the mild hydrolyzability and easy handleability of curable compositions based on the organic polymer (A) obtained. Among the alkoxyhydrosilanes, methyldimethoxysilane is preferred because of its ready availability and excellent various properties (curability, storage stability, elongation property, tensile strength, etc.) of curable compositions based on the organic polymer (A) obtained and cured products obtained therefrom.

The synthetic method (b) is not particularly restricted but may be, for example, the method of introducing a mercapto group- and reactive silyl group-containing compound into an unsaturated-bond site in the organic polymer by a radical addition reaction in the presence of a radical initiator and/or a radical generation source. The mercapto group- and reactive silyl group-containing compound is not particularly restricted but includes, for example, γ-mercaptopropyltrimethoxysilane, γ-mercaptopropylmethyldimethoxysilane, γ-mercaptopropyltriethoxysilane, γ-mercaptopropylmethyldiethoxysilane, mercaptomethyltrimethoxysilane and mercaptomethyltriethoxysilane.

The method of reacting a hydroxyl group-terminated polymer with an isocyanate group- and reactive silyl group-containing compound according to the synthetic method (c) is not particularly restricted but may be, for example, the method disclosed in Japanese Kokai Publication H03-47825. The isocyanate group- and reactive silyl group-containing compound is not particularly restricted but includes, for example, γ-isocyanatopropyltrimethoxysilane, γ-isocyanatopropylmethyldimethoxysilane, γ-isocyanatopropyltriethoxysilane, γ-isocyanatopropylmethyldiethoxysilane, isocyanatomethyltrimethoxysilane, isocyanatomethyltriethoxysilane, isocyanatomethyldimethoxymethylsilane and isocyanatomethyldiethoxymethylsilane.

In the case of silane compounds containing a silicon atom with three hydrolyzable groups bound thereto, for example trimethoxysilane, the disproportionation reaction may proceed rapidly in certain cases. The progress of the disproportionation reaction may sometimes result in the formation of such a dangerous compound as dimethoxysilane.

In the case of γ-mercaptopropyltrimethoxysilane and γ-isocyanatopropyltrimethoxysilane, however, such disproportionation reaction will not proceed. Therefore, in the case of using, as the silyl group, a group containing a silicon atom with three hydrolyzable groups bound thereto, for example a trimethoxysilyl group, the synthetic method (b) or (c) is preferably employed.

On the other hand, in the case of silane compounds represented by the formula (9):

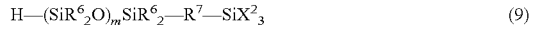

(wherein the three $X^2$s each independently represent a hydroxyl group or a hydrolyzable group; the $(2m+2)$ $R^6$s each independently represent a hydrocarbon group, preferably, from the availability and cost viewpoint, a hydrocarbon group containing 1 to 20 carbon atoms, more preferably a hydrocarbon group containing 1 to 8 carbon atoms, particularly preferably a hydrocarbon group containing 1 to 4 carbon atoms; $R^7$ is a divalent organic group, preferably, from the availability and cost viewpoint, a divalent $C_{1-12}$ hydrocarbon group, more preferably a divalent $C_{2-8}$ hydrocarbon group, particularly preferably a divalent $C_2$ hydrocarbon group; and m is an integer of 0 to 19, preferably, from the availability and cost viewpoint, 1), the disproportionation reaction will not proceed. Therefore, for introducing a group containing a silicon atom with three hydrolyzable groups bound thereto by the synthetic method (a), a silane compound represented by the formula (9) is preferably used.

As the silane compound represented by the formula (9), there may be mentioned 1-[2-(trimethoxysilyl)ethyl]-1,1,3,3-tetramethyldisiloxane, 1-[2-(trimethoxysilyl)propyl]-1,1,3,3-tetramethyldisiloxane and 1-[2-(trimethoxysilyl)hexyl]-1,1,3,3-tetramethyldisiloxane.

The reactive silyl group-containing organic polymer (A) to be used may have either a straight chain structure or a branched chain structure in the molecule thereof, and the number average molecular weight thereof, as expressed in terms of the value on a polystyrene equivalent basis as derived from the value measured by GPC, is preferably 500 to 100,000, more preferably 1,000 to 50,000, particularly preferably 3,000 to 30,000. When the number average molecular weight is lower than 500, the cured products obtained tend to be inferior in elongation properties and, when it is in excess of 100,000, the resulting curable composition becomes high in viscosity and tends to be inferior in workability.

The number of reactive silyl groups contained in each molecule of the organic polymer (A) is preferably not smaller than 1 on an average; it is preferably 1.1 to 5. When the number of reactive silyl groups contained in each molecule is smaller than 1 on an average, the curable composition tends to be inferior in curability and the cured products obtained show a tendency toward failure to exhibit a good rubber elastic behavior.

The reactive silyl group may occur at a main chain end or at a side chain end, or at both. In particular, when the reactive silyl group occurs only at a main chain end, the effective network size in the organic polymer component contained in the cured products obtained becomes increased, so that it becomes easy to obtain rubber-like cured products showing high strength, high elongation and low elastic modulus.

The curable composition of the present invention includes, as an essential constituent, an amidine compound (B) represented by the formula (1):

(wherein $R^2$, $R^3$, and the two $R^4$s each independently represent a hydrogen atom or an organic group), which serves as a curing catalyst of the reactive silyl group-containing polymer (A)

Use of the amidine compound (B) as a curing catalyst allows the curable composition of the present invention to have practical curability in spite of being a non-organotin type catalyst, and the obtained cured products to have good adhesiveness to various substrates.

As $R^2$ in the formula (1), a hydrogen atom or a hydrocarbon group is preferred since they increase curability of the organic polymer (A), and more preferred is a hydrocarbon group in which the carbon atom located in the a position with respect to the nitrogen atom does not have an unsaturated bond. In cases where $R^2$ is an organic group or a hydrocarbon group, the number of carbon atoms contained therein is preferably 1 to 20, and more preferably 1 to 10, from the ready-availability viewpoint.

As $R^3$ in the formula (1), preferred is a hydrogen atom or an organic group represented by $-NR^5_2$ (wherein the two $R^5$s each independently represent a hydrogen atom or an organic group) since they can enhance curability of the organic polymer (A), and an organic group represented by —NR$^5_2$ is more preferred.

It is to be noted that the amidine compound defined by the formula (1) wherein R$^3$ is an organic group represented by the above-mentioned —NR$^5_2$ is referred to as a guanidine compound. The guanidine compound is preferably a compound in which R$^5$ is a hydrogen atom or a $C_{1-20}$ hydrocarbon group, and preferably a compound in which R$^5$ is a hydrogen atom or a $C_{1-10}$ hydrocarbon group, because of its ready availability and a great effect of increasing curability of the organic polymer (A).

Because of good adhesiveness of the cured products obtained, R$^3$ in the formula (1) is preferably an organic group represented by —NR$^{15}$—C(=NR$^{16}$)—NR$^{17}_2$ (wherein R$^{15}$, R$^{16}$ and the two R$^{17}$s each independently represent a hydrogen atom or an organic group) and/or —N=C(=NR$^{18}_2$)—NR$^{19}_2$ (wherein the two R$^{18}$s and two R$^{19}$s each independently represent a hydrogen atom or an organic group).

It is to be noted that the amidine compound defined by the formula (1) wherein R$^3$ is such an organic group as the —NR$^{15}$—C(=NR$^{16}$)—NR$^{17}_2$ or —N=C(=NR$^{18}_2$)—NR$^{19}_2$ mentioned above is referred to as a biguanide compound.

The biguanide compound defined by the formula (1) wherein R$^3$ is an organic group represented by the —NR$^{15}$—C(=NR$^{16}$)—NR$^{17}_2$ is preferably a compound in which R$^{15}$, R$^{16}$ and the two R$^{17}$s each independently represent a hydrogen atom or a $C_{1-20}$ hydrocarbon group, and more preferably a compound in which R$^{15}$, R$^{16}$ and the two R$^{17}$s each independently represent a hydrogen atom or a $C_{1-10}$ hydrocarbon group, because of its ready availability and good adhesiveness of the cured products obtained. Furthermore, still more preferred is a compound in which at least one among the R$^2$, two R$^4$s, R$^{15}$, R$^{16}$, and two R$^{17}$s represent(s) an aryl group since the adhesiveness of the cured products obtained can be more improved.

The biguanide compound in which R$^3$ is an organic group represented by the —N=C(=NR$^{18}_2$)—NR$^{19}_2$ is preferably a compound in which R$^2$, the two R$^4$s, R$^{18}$ and the two R$^{19}$s each independently represent a hydrogen atom or a $C_{1-20}$ hydrocarbon group, and more preferably a compound in which R$^2$, the two R$^4$s, R$^{18}$ and the two R$^{19}$s each independently represent a hydrogen atom or a $C_{1-10}$ hydrocarbon group, because of its ready availability and good adhesiveness of the cured products obtained.

The two R$^4$s in the formula (1) are each preferably a hydrogen atom or a $C_{1-20}$ hydrocarbon group, and more preferably a hydrogen atom or a $C_{1-10}$ hydrocarbon group, because of its ready availability and the effect of increasing curability of the organic polymer (A).

The number of carbon atoms contained in the amidine compound (B) of the formula (1) is preferably not smaller than 2, more preferably not smaller than 6, and particularly preferably not smaller than 7.

When the number of carbon atoms is as small as less than 2 (namely, the molecular weight is low), the volatility of the compound becomes increased, causing a tendency toward pollution of the work environment. It is not necessary to particularly specify the upper limit to the number of carbon atoms contained in the amidine compound (B); it is generally preferred, however, that the number of carbon atoms be not higher than 10,000. For the same reasons as mentioned above, the amidine compound (B) preferably has a molecular weight of not smaller than 60, more preferably not smaller than 120, and particularly preferably not smaller than 130. It is not necessary to particularly specify the upper limit to the molecular weight thereof; it is generally preferred, however, that the molecular weight be not higher than 100,000.

The amidine compound (B) (inclusive of the guanidine compound and biguanide compound) is not particularly restricted but includes pyrimidine compounds such as pyrimidine, 2-aminopyrimidine, 6-amino-2,4-dimethylpyrimidine, 2-amino-4,6-dimethylpyrimidine, 1,4,5,6-tetrahydropyrimidine, 1,2-dimethyl-1,4,5,6-tetrahydropyrimidine, 1-ethyl-2-methyl-1,4,5,6-tetrahydropyrimidine, 1,2-diethyl-1,4,5,6-tetrahydropyrimidine, 1-n-propyl-2-methyl-1,4,5,6-tetrahydropyrimidine, 2-hydroxy-4,6-dimethylpyrimidine, 1,3-diazanaphthalene, and 2-hydroxy-4-aminopyrimidine; imidazoline compounds such as 2-imidazoline, 2-methyl-2-imidazoline, 2-ethyl-2-imidazoline, 2-propyl-2-imidazoline, 2-vinyl-2-imidazoline, 1-(2-hydroxyethyl)-2-methyl-2-imidazoline, 1,3-dimethyl-2-iminoimidazolidine and 1-methyl-2-iminoimidazolidine-4-one; amidine compounds such as 1,8-diazabicyclo[5.4.0]undec-7-ene (hereinafter referred to as DBU), 1,5-diazabicyclo[4.3.0]non-5-ene, 2,9-diazabicyclo[4.3.0]non-1,3,5,7-tetraene, and 6-(dibutylamino)-1,8-diazabicyclo[5.4.0]undecene-7 (hereinafter referred to as DBA-DBU); guanidine compounds such as guanidine, dicyandiamide, 1-methylguanidine, 1-ethylguanidine, 1-cyclohexylguanidine, 1-phenylguanidine, 1-(o-tolyl)guanidine, 1,1-dimethylguanidine, 1,3-dimethylguanidine, 1,2-diphenylguanidine, 1,1,2-trimethylguanidine, 1,2,3-trimethylguanidine, 1,1,3,3-tetramethylguanidine, 1,1,2,3,3-pentamethylguanidine, 2-ethyl-1,1,3,3-tetramethylguanidine, 1,1,3,3-tetramethyl-2-n-propylguanidine, 1,1,3,3-tetramethyl-2-isopropylguanidine, 2-n-butyl-1,1,3,3-tetramethylguanidine, 2-tert-butyl-1,1,3,3-tetramethylguanidine, 1,2,3-tricyclohexylguanidine, 1-benzyl-2,3-dimethylguanidine, 1,5,7-triazabicyclo[4.4.0]dec-5-ene, 7-methyl-1,5,7-triazabicyclo[4.4.0]dec-5-ene, 7-ethyl-1,5,7-triazabicyclo[4.4.0]dec-5-ene, 7-n-propyl-1,5,7-triazabicyclo[4.4.0]dec-5-ene, 7-isopropyl-1,5,7-triazabicyclo[4.4.0]dec-5-ene, 7-n-butyl-1,5,7-triazabicyclo[4.4.0]dec-5-ene, 7-cyclohexyl-1,5,7-triazabicyclo[4.4.0]dec-5-ene, and 7-n-octyl-1,5,7-triazabicyclo[4.4.0]dec-5-ene; and biguanide compounds such as biguanide, 1-methylbiguanide, 1-ethylbiguanide, 1-n-butylbiguanide, 1-(2-ethylhexyl)biguanide, 1-n-octadecylbiguanide, 1,1-dimethylbiguanide, 1,1-diethylbiguanide, 1-cyclohexylbiguanide, 1-allylbiguanide, 1-phenylbiguanide, 1-(o-tolyl)biguanide, 1-morpholinobiguanide, 1-n-butyl-N$^2$-ethylbiguanide, 1,1'-ethylenebisbiguanide, 1,5-ethylenebiguanide, 1-[3-(diethylamino)propyl]biguanide, 1-[3-(dibutylamino)propyl]biguanide, and N',N''-dihexyl-3,12-diimino-2,4,11,13-tetraazatetradecanedia midine.

Either a single species among these amidine compounds may be incorporated in the curable composition or a combination of a plurality thereof may be incorporated in the curable composition.

Preferred among those amidine compounds mentioned above are 1-(o-tolyl)biguanide, 1-phenylbiguanide, 1-(o-tolyl)guanidine, 1-phenylguanidine, 1,2-dimethyl-1,4,5,6-tetrahydropyrimidine, 1,5,7-triazabicyclo[4.4.0]dec-5-ene, 7-methyl-1,5,7-triazabicyclo[4.4.0]dec-5-ene, and like guanidine compounds, since they are highly active and can impart good curability to the organic polymer (A).

Further, 1-(o-tolyl)biguanide, 1-phenylbiguanide, 1-(o-tolyl)guanidine, and 1-phenylguanidine are more preferred since they are readily available and can enhance curability of the organic polymer (A) and the cured products obtained show good adhesiveness.

The addition level of the amidine compound (B) is preferably 0.1 to 30 parts by weight, and more preferably 0.1 to 12 parts by weight, per 100 parts by weight of the organic polymer (A). When the addition level of the amidine compound (B) is below 0.1 parts by weight, the curable composition may fail to obtain a practical rate of curing and it tends to become difficult for the curing reaction to proceed to a sufficient extent. On the other hand, when the level of addition of the amidine compound (B) is above 30 parts by weight, the curing time of the curable composition becomes too short, hence the workability tends to become worsened.

While the curable composition of the present invention uses an amidine compound as a curing catalyst, another curing catalyst can be used in combination, if necessary, so long as the effects of the present invention will not be reduced.

The curing catalyst other than the amidine compound is not particularly restricted but includes, for example, carboxylic acid metal salts such as tin carboxylates, lead carboxylates, bismuth carboxylates, potassium carboxylates, calcium carboxylates, barium carboxylates, titanium carboxylates, zirconium carboxylates, hafnium carboxylates, vanadium carboxylates, manganese carboxylates, iron carboxylates, cobalt carboxylates, nickel carboxylates and cerium carboxylates; titanium compounds such as tetrabutyl titanate, tetrapropyl titanate, titanium tetrakis(acetylacetonate), bis(acetylacetonato)diisopropoxytitanium and diisopropoxytitanium bis (ethyl acetoacetate); organotin compounds such as dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltin bis(octyl maleate), dibutyltin bis(tridecyl maleate), dibutyltin bis(benzyl maleate), dibutyltin diacetate, dioctyltin bis(ethyl maleate), dioctyltin bis(octyl maleate), dibutyltin dimethoxide, dibutyltin bis(nonylphenoxide), dibutenyltin oxide, dibutyltin oxide, dibutyltin bis(acetylacetonate), dibutyltin bis(ethyl acetoacetonate), reaction products of dibutyltin oxide-silicate compound and reaction products of dibutyltin oxide-phthalic acid ester; aluminum compounds such as aluminum tris(acetylacetonate), aluminum tris(ethyl acetoacetate) and diisopropoxyaluminum ethyl acetoacetate; zirconium compounds such as zirconium tetrakis(acetylacetonate); various metal alkoxides such as tetrabutoxyhafnium; organic acidic phosphoric acid esters; organosulfonic acids such as trifluoromethanesulfonic acid; inorganic acids such as hydrochloric acid, phosphoric acid and boronic acid; and so forth.

The combined use of the curing catalysts other than the amidine compounds with the amidine compounds is expected to increase the catalytic activity and improve such properties as depth curability and thin layer curability of the curable composition, and adhesiveness of the cured products obtained.

Since, however, when an organotin compound is used in combination, the toxicity of the curable composition tends to increase with the increase in organotin blending level, the blending level of the organotin compound is preferably small and, more specifically, it is preferably not higher than 1 part by weight, more preferably not higher than 0.5 parts by weight, and particularly preferably not higher than 0.05 parts by weight, per 100 parts by weight of the organic polymer (A); substantial absence thereof is most preferred.

In cases where a metal compound other than an organotin is used in combination, from the viewpoint of reduction in environmental stress, the blending level thereof is preferably small, more specifically is preferably not higher than 5 parts by weight, and more preferably not higher than 2 parts by weight, per 100 parts by weight of the organic polymer (A), and substantial absence thereof is most preferred.

The curable composition of the present invention includes a plasticizer (C) as an essential constituent. The plasticizer (C) to be blended has a high solubility to amidine compounds, and has a function to uniformly disperse the amidine compound (B) into the curable composition.

Blending of the plasticizer (C) makes it possible to adjust the viscosity and slump (sagging) properties of the curable composition obtained, and mechanical properties (tensile strength, elongation, and the like) of the cured products obtained. It is also possible to adjust mechanical properties such as tensile strength and elongation of the cured products obtained. Further, since the plasticizer (C) is well compatible with the reactive sillyl group-containing polymer (A), it does not isolate in the curable composition. The cured products obtained do not bleed out from the surface for a long period of time, and can maintain favorable physical properties.

The plasticizer (C) preferably has a boiling point of 200° C. or higher at 760 mmHg to be less volatile. When the boiling point is lower than 200° C., the plasticizer (C) volatilizes upon use of the curable composition including it in a room or the like, may cause a tendency toward pollution of the work environment, and may have adverse effect on human body.

The plasticizer (C) is not particularly restricted but includes: phthalate esters such as dibutyl phthalate, diheptyl phthalate, di(2-ethylhexyl)phthalate, and butyl benzyl phthalate; nonaromatic dibasic acid esters such as dioctyl adipate, dioctyl sebacate, dibutyl sebacate, and isodecyl succinate; aliphatic esters such as butyl oleate and methyl acetyl ricinoleate; phosphoric acid esters such as tricresyl phosphate and tributyl phosphate; alkyl sulfuric acid esters; trimellitic acid esters; chlorinated paraffins; hydrocarbon type oils such as alkyldiphenyl and partially hydrogenated terphenyl; process oils; and the like.

A polymeric plasticizer can also be blended. The polymeric plasticizer is not particularly restricted but includes: vinyl polymers obtained by polymerization of vinyl monomers by various methods; polyalkylene glycol esters such as diethylene glycol dibenzoate, triethylene glycol dibenzoate and pentaerythritol esters; polyester plasticizers derived from a dibasic acid such as sebacic acid, adipic acid, azelaic acid and phthalic acid and a dihydric alcohol such as ethylene glycol, diethylene glycol, triethylene glycol, propylene glycol and dipropylene glycol; polyethers such as polyether polyols including polyethylene glycol, polypropylene glycol and polytetramethylene glycol, each having a molecular weight of not lower than 500, and preferably not lower than 1000, or those derivatives derived from such polyether polyols by esterification or etherification of one or more hydroxyl groups therein; polystyrenes such as polystyrene and poly-α-methylstyrene; polybutadiene, polybutene, polyisobutylene, butadiene-acrylonitrile copolymers, polychloroprene and the like.

The propylene glycol type plasticizers are preferred among these plasticizers since they are highly compatible with the reactive silyl group-containing polymer (A) and the amidine compound (B) and provide the curable composition excellent in depth curability.

The propylene glycol type plasticizers are not particularly restricted but include, for example, propylene glycol, dipropylene glycol, tripropylene glycol, tetrapropylene glycol, propylene glycol methyl ether, propylene glycol ethyl ether, dipropylene glycol methyl ether, dipropylene glycol n-butyl ether, tripropylene glycol methyl ether, tripropylene glycol ethyl ether, tripropylene glycol n-butyl ether, propylene glycol methyl ether acetate, dipropylene glycol methyl ether acetate, tripropylene glycol methyl ether acetate, propylene chlorohydrin, polypropylene glycol monostearate, polypropylene glycol monooleate, polypropylene glycol dilaurate, polypropylene glycol distearate, polypropylene glycol dioleate, polyoxypropylene sorbitan monostearate, polyoxypropylene sorbitan monooleate, polyoxypropylene oleyl ether, polyoxypropylene monolauryl ether, polyoxypropylene monostearyl ether, and the like.

Among these propylene glycol type plasticizers, those having a structure of (poly)propylene glycol alkyl ether with only one hydroxyl group in a molecule thereof are preferred because of their particularly high solubility to the amidine compound (B).

The plasticizers having a structure of propylene glycol alkyl ether are not particularly restricted but include, for example, propylene glycol methyl ether, propylene glycol ethyl ether, propylene glycol n-propyl ether, propylene glycol n-butyl ether, propylene glycol phenyl ether, dipropylene glycol methyl ether, dipropylene glycol ethyl ether, dipropylene glycol n-propyl ether, dipropylene glycol n-butyl ether, dipropylene glycol phenyl ether, tripropylene glycol methyl ether, tripropylene glycol ethyl ether, tripropylene glycol n-propyl ether, tripropylene glycol n-butyl ether, tripropylene glycol phenyl ether, tetrapropylene glycol methyl ether, tetrapropylene glycol ethyl ether, tetrapropylene glycol n-propyl ether, tetrapropylene glycol n-butyl ether, tetrapropylene glycol phenyl ether, and the like.

Among these, tripropylene glycol methyl ether (boiling point of 242° C. at 760 mmHg), dipropylene glycol n-propyl ether (ditto: 212° C.), dipropylene glycol n-butyl ether (ditto: 229° C.), tripropylene glycol n-butyl ether (ditto: 274° C.), propylene glycol phenyl ether (ditto: 243° C.) and the like are more preferred because their boiling points are high.

Since tripropylene glycol n-butyl ether has a boiling point of not lower than 250° C. and tends not to volatilize, it does not act as a VOC source and therefore is particularly preferred. Tripropylene glycol n-butyl ether compounds are industrially produced and readily available from Dow Chemical Japan, Ltd., LYONDELL Chemical Co., BASF AG, and the like, principally under the trade name "TPnB".

The molecular weight of the plasticizer (C) is preferably 50 to 10000, more preferably 80 to 3000, and further preferably 100 to 2000. When the molecular weight is too low, the plasticizer tends to escape from the obtained cured products with the lapse of time due to heat or rainfall, and fail to maintain the initial physical properties over a long period of time. When the molecular weight is too high, the solubility to the amidine compound (B) tends to be low.

The blending level of the plasticizer (C) is preferably used in an amount of 0.1 to 100 parts by weight, and more preferably in an amount of about 1 to 50 parts by weight, per 100 parts by weight of the reactive silyl-group containing organic polymer (A). When the blending level of the plasticizer (C) is less than 0.1 parts by weight, the solubility of the amidine compound (B) tends to be low. On the other hand, when the blending level of the plasticizer (C) is in excess of 100 parts by weight, the sagging resistance of the curable composition may be reduced to cause poor workability thereof. Either a single species among the plasticizers (C) may be incorporated in the curable composition or a combination of a plurality thereof may be incorporated in the curable composition.

The curable composition of the present invention includes an amino group-containing silane coupling agent (D) as an essential constituent.

It is to be noted that the amino group-containing silane coupling agent is a compound having at least a hydrolyzable silyl group and an amino group in a molecule thereof.

In the present invention, blending of the amino group-containing silane coupling agent (D) in the curable composition leads to improved solubility of the amidine compound (B) in the plasticizer (C).

When the amino group-containing silane coupling agent (D) is mixed with the amidine compound (B) and the plasticizer (C), the amino group-containing silane coupling agent (D) acts so as to remove moisture contained in the mixture and has an effect of preventing the mixture from thickening and curing.

The amino group-containing silane coupling agent (D) also has an effect of enhancing the storage stability of the curable composition obtained by mixing the above-mentioned mixture with the reactive silyl group-containing polymer (A). It is also preferred from the viewpoint of improving adhesiveness to substrates.

As the hydrolyzable silyl group in the amino group-containing silane coupling agent (D), there may be mentioned those groups represented by the formula (2): —$SiR^1{}_nX^1{}_{3-n}$ wherein $X^1$ is a hydrolyzable group. More specifically, there may be mentioned those groups described hereinabove as hydrolyzable groups. Among those, a methoxy group, an ethoxy group and like groups are preferred from the appropriate hydrolyzability viewpoint. The number of hydrolyzable groups contained in one molecule of the silane coupling agent is preferably not smaller than 2, and particularly preferably not smaller than 3.

The amino group-containing silane coupling agent (D) is not particularly restricted but includes aminosilanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, 2-aminoethylaminomethyltrimethoxysilane, N-cyclohexylaminomethyltriethoxysilane, N-cyclohexylaminomethyldiethoxymethylsilane, γ-ureidopropyltrimethoxysilane, γ-ureidopropyltriethoxysilane, N-phenyl-γ-aminopropyltrimethoxysilane, N-phenylaminomethyltrimethoxysilane, N-benzyl-γ-aminopropyltrimethoxysilane, N-vinylbenzyl-γ-aminopropyltriethoxysilane, N-(3-triethoxysilylpropyl)-4,5-dihydroimidazole, N-cyclohexylaminomethyltriethoxysilane, N-cyclohexylaminomethyldiethoxymethylsilane, N-phenylaminomethyltrimethoxysilane, (2-aminoethyl)aminomethyltrimethoxysilane and N,N'-bis[3-(trimethoxysilyl)propyl]ethylenediamine; ketimine type silanes such as N-(1,3-dimethylbutylidene)-3-(triethoxysilyl)-1-propanamine, and condensation products resulting from partial condensation of the silanes mentioned above.

From the viewpoints of compatibility, transparency, and availability, γ-aminopropyl trimethoxysilane is particularly preferable among the above-mentioned amino group-containing silane coupling agents (D).

Either a single species among the amino group-containing silane coupling agents (D) may be incorporated in the curable composition or a combination of a plurality thereof may be incorporated in the curable composition.

Upon selecting the amino group-containing silane coupling agent, for the purpose of preventing the surface curability of the curable composition from changing during storage, it is preferable to use those silane coupling agents having a hydrolyzable group of the same structure as that of the hydrolyzable group in the organic polymer (A). That is, when the hydrolyzable silyl group of the organic polymer (A) is a methoxysilyl group, the silane coupling agent (D) having a structure of the methoxysilyl group is selected. When the hydrolyzable silyl group of the organic polymer (A) is an ethoxysilyl group, the silane coupling agent (D) having a structure of the ethoxysilyl group is selected.

As for a method of blending the amidine compound (B), plasticizer (C), and the amino group-containing silane coupling agent (D), the following can be carried out. Namely, the three may be mixed together and then added; or the amidine compound (B) may be mixed in advance with the plasticizer (C), and thereto added the amino group-containing silane coupling agent (D).

The amino group-containing silane coupling agent (D) may be used in combination with the amidine compound (B) and the plasticizer (C), or may be singly used. The blending level of the amino group-containing silane coupling agent (D) is preferably 0.01 to 20 parts by weight, more preferably 0.1 to 10 parts by weight, and particularly preferably 1 to 7 parts by weight, per 100 parts by weight of the organic polymer (A). When the blending level thereof is below 0.01 parts by weight, the storage stability of the curable composition tends to be inferior, and the adhesiveness of the obtained cured products tends to be inferior. On the other hand, when the blending level thereof is in excess of 20 parts by weight, any practical depth curability of the curable composition tends not to be obtained.

Silane coupling agents other than the amino group-containing silane coupling agents (D) mentioned above can be added, if necessary, to the curable composition of the present invention.

Examples of the functional group occurring in the silane coupling agents other than the amino group-containing silane coupling agent (D) include a mercapto group, an epoxy group, a carboxyl group, a vinyl group, an isocyanate group, isocyanurate, halogen, and the like.

Silane coupling agents other than the amino group-containing silane coupling agent (D) are not particularly restricted but include: isocyanate silanes such as γ-isocyanatepropyltrimethoxysilane, γ-isocyanatepropyltriethoxysilane, γ-isocyanatepropylmethyldiethoxysilane, γ-isocyanatepropylmethyldimethoxysilane, (isocyanatemethyl) trimethoxysilane, and (isocyanatemethyl) dimethoxymethylsilane; mercaptosilanes such as γ-mercaptopropyltrimethoxysilane, γ-mercaptopropyltriethoxysilane, γ-mercaptpropylmethyldimethoxysilane, γ-mercaptopropylmethyldiethoxysilane, mercaptomethyltrimethoxysilane, and mercaptomethyltriethoxysilane; epoxy silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and β-(3,4-epoxycyclohexyl)ethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl unsaturated group-containing silanes such as vinyltrimethoxysilane, vinyltriethoxysilane, γ-methacryloyloxypropylmethyldimethoxysilane, γ-acryloyloxypropyltriethoxysilane, and methacryloyloxymethyltrimethoxysilane; halogen-containing silanes such as γ-chloropropyltrimethoxysilane; isocyanurate silanes such as tris(3-trimethoxysilylpropyl) isocyanurate; and the like. Another example thereof is condensation products resulting from partial condensation of the silanes mentioned above.

Either a single species among these silane coupling agents may be incorporated in the curable composition or a combination of a plurality thereof may be incorporated in the curable composition.

Upon selecting this silane coupling agent, for the purpose of preventing the surface curability of the curable composition from changing during storage, it is preferable to use those silane coupling agents having a hydrolyzable group of the same structure as that of the hydrolyzable group in the organic polymer (A).

The blending level of the silane coupling agent (D) is preferably 0.01 to 20 parts by weight, more preferably 0.1 to 10 parts by weight, and particularly preferably 1 to 7 parts by weight, per 100 parts by weight of the organic polymer (A). When the blending level of the amino group-containing silane coupling agent (D) is below 0.01 parts by weight, the storage stability of the curable composition tends to be inferior, and the adhesiveness of the cured products obtained tends to be inferior. On the other hand, when the blending level thereof is in excess of 20 parts by weight, any practical depth curability of the curable composition tends not to be obtained.

It is possible to add, to the curable composition of the present invention, not only a plasticizer (C) that mainly has a function of uniformly dispersing the amidine compound (B) into the curable composition, but also, if necessary, plasticizers other than the plasticizer (C) that mainly impart the functions of adjusting the viscosity and slump properties of the curable composition, and of adjusting such mechanical properties as tensile strength and elongation property of the cured products obtained.

Namely, in the curable composition of the present invention, a mixture obtained by preliminarilly dissolving and/or dispersing the amidine compound (B) in the plasticizer (C) and the silane coupling agent (D) having an amino group in a molecule is mixed in the reactive silyl group-containing organic polymer (A) for the purpose of uniformly dispersing the amidine compound (B) into the curable composition. The plasticizers other than the plasticizer (C) are not contained in the mixture mentioned above, but added upon mixing the organic polymer (A) with the mixture.

Specific and preferred examples of plasticizers other than the plasticizer (C) include those mentioned above regarding the plasticizer (C). Among these plasticizers, those highly compatible with the organic polymer (A) are preferred and, for example, polyethers and vinyl polymers may be mentioned. Polyethers are more preferred since they provide the curable composition with good surface curability and depth curability and cause no curing retardation after storage; more specifically, polypropylene glycol is particularly preferred.

Further, vinyl polymers are preferred since they have high compatibility with the organic polymer (A) and provide the resulting cured products with good weather resistance and thermal stability; among them, acrylic polymers and/or methacrylic polymers are more preferred, and such acrylic polymers as polyacrylic acid alkyl esters are particularly preferred.

While the method of producing the polyacrylic acid alkyl esters is not particularly restricted, the living radical polymerization method is preferred because of capability of its giving polymers narrow in molecular weight distribution and possibly low in viscosity, and the atom transfer radical polymerization method is more preferred. Also particularly preferred is the method called "SGO process" and disclosed in Japanese Kokai Publication 2001-207157, which comprises continuously bulk-polymerizing an acrylic acid alkyl ester type compound under high-temperature and high-pressure conditions.

The number average molecular weight of the polymeric plasticizer is 500 to 15000, preferably 800 to 10000, more preferably 1000 to 8000, particularly preferably 1000 to 5000, and most preferably 1000 to 3000. When the molecular weight of the polymeric plasticizer is too low, the plasticizer may escape from the cured products obtained with the lapse of time due to heat or rainfall and, as a result, it cannot maintain the initial physical properties over a long period of time, staining by adhesion of dust may possibly be caused and the alkyd applicability tends to become poor. On the other hand, when the molecular weight is excessively high, the viscosity of the curable composition will increase and the workability tends to become poor.

The molecular weight distribution of the polymeric plasticizer is not particularly restricted but preferably is narrow, for example narrower than 1.80, preferably not wider than 1.70, more preferably not wider than 1.60, still more preferably not wider than 1.50, particularly preferably not wider than 1.40, and most preferably not wider than 1.30.

In the case of polyether type polymers, the number average molecular weight is determined by the end-group analysis and, in the case of other polymers, it is determined by the GPC method. The molecular weight distribution (Mw/Mn) is measured by the GPC method (on the polystyrene equivalent basis).

The polymeric plasticizer may be a reactive silyl group-containing one or a reactive silyl group-free one; a reactive silyl group-containing polymeric plasticizer is preferably added, however, since the polymeric plasticizer is involved in the curing reaction and thus, the plasticizer can be prevented from migrating from the cured products obtained.

The reactive silyl group-containing polymeric plasticizer is preferably a compound whose reactive silyl group content is, on an average, not more than one, and more preferably not more than 0.8, per molecule.

When a reactive silyl group-containing plasticizer, in particular a reactive silyl group-containing oxyalkylene polymer, is added, it is preferred that the number average molecular weight thereof be lower than that of the organic polymer (A) so that a satisfactory plasticizing effect may be obtained.

The plasticizer to be added may include a single species or a combination of a plurality of species. It is also possible to add a low-molecular-weight plasticizer and a polymeric plasticizer in combination. The plasticizer addition is preferably made on the occasion of the production of the organic polymer (A).

For example, an epoxy resin, a phenol resin, sulfur, alkyl titanates, aromatic polyisocyanate, and the like can be added, if necessary, to the curable composition of the present invention in order to give an adhesiveness-imparting effect. These may be added singly or a plurality thereof may be added in combination. However, since increase in the addition level of the epoxy resin tends to lower the catalytic activity of the amidine compound (B), the addition level of the epoxy resin is preferably small. The addition level of the epoxy resin is preferably not higher than 5 parts by weight, and more preferably not higher than 0.5 parts by weight, per 100 parts by weight of the organic polymer (A); however, it is particularly preferable not to contain any epoxy resin.

To the curable composition of the present invention, there can be added a filler, if necessary. The filler is not particularly restricted but includes: reinforcing fillers such as fumed silica, precipitated silica, crystalline silica, fused silica, dolomite, silicic anhydride, hydrous silicic acid and carbon black; heavy calcium carbonate, colloidal calcium carbonate, magnesium carbonate, diatomaceous earth, calcined clay, clay, talc, titaniumoxide, bentonite, organicbentonite, ferric oxide, fine aluminum powder, flint powder, zinc oxide, activated zinc white, shirasu balloons, glass microballoons, organic microballoons based on a phenol resin or a vinylidene chloride resin, organic powders such as PVC powder and PMMA powder; and fibrous fillers such as asbestos, glass fibers and filaments.

When a filler is added, the addition level thereof is preferably 1 to 250 parts by weight, and more preferably 10 to 200 parts by weight, per 100 parts by weight of the organic polymer (A).

On the occasion of using the curable composition as a one-pack type adhesive or sealant, it is preferred, for obtaining good storage stability, that such a filler as mentioned above be uniformly mixed with a dehydrating agent such as calcium oxide and the mixture be allowed to stand in a sealed bag made of an airtight material for a proper period of time for dehydrating and drying, and then used, as disclosed in Japanese Kokai Publication 2001-181532 and the like.

When the cured products obtained are to be used in the fields of application where transparency is required, a polymer powder containing a polymer of methyl methacrylate and the like, and noncrystalline silica, are preferred as the filler to be added, as disclosed in Japanese Kokai Publication H11-302527 and the like; hydrophobic silica and the like, as disclosed in Japanese Kokai Publication 2000-38560 and the like, are more preferred.

The hydrophobic silica, so referred to herein, is a product derived by treating the surface of the silicon dioxide fine powder generally occupied by silanol (—SiOH) groups with an organosilicon halide, an alcohol or the like for conversion of those groups to (—SiO-hydrophobic groups). The hydrophobic silica is not particularly restricted but includes, for example, products obtained by treating silanol groups occurring on a silicon dioxide fine powder with dimethylsiloxane, hexamethyldisilazane, dimethyldichlorosilane, trimethoxyoctylsilane, trimethylsilane, or the like. The untreated silicon dioxide fine powder whose surface is occupied by silanol (—SiOH) groups is called hydrophilic silica fine powder.

When the cured products obtained are to be used in the fields of application where high strength is required, silicon compounds such as fumed silica, precipitated silica, crystalline silica, fused silica, dolomite, silicic anhydride and hydrous silicic acid; carbon black, surface-treated finely divided calcium carbonate, calcined clay, clay, activated zinc white and the like are preferred as the filler to be added, and the addition level thereof is preferably 1 to 200 parts by weight per 100 parts by weight of the organic polymer (A).

Further, when the cured products obtained are to be used in the fields of application where low strength and high elongation modulus are required, titanium oxide, calcium carbonate such as heavy calcium carbonate, magnesium carbonate, talc, ferric oxide, zinc oxide and shirasu balloons are preferred as the filler to be added, and the addition level thereof is preferably 5 to 200 parts by weight per 100 parts by weight of the organic polymer (A).

When calcium carbonate is added, the tendency toward improvements in the breaking strength, breaking elongation and adhesiveness of the cured products obtained increases as the specific surface area increases. Only one of these filler species may be added or a plurality of species thereof may be added in combination.

The example of addition of a plurality of additives is not particularly restricted but the combined use of a surface-treated fine calcium carbonate and a calcium carbonate larger in particle diameter such as heavy calcium carbonate is preferred since cured products excellent in physical properties can be obtained.

Preferred as the surface-treated fine calcium carbonate are those whose particle diameter is not larger than 0.5 µm and whose particle surface has been treated with fatty acids or fatty acid salts.

Preferred as the calcium carbonate having a large particle diameter are those whose particle diameter is not smaller than 1 µm and whose particle surface has not been treated.

In cases where the curable composition is required to have good workability (releasability, etc.) or where the surface of the cured products obtained is required to be matted, organic balloons or inorganic balloons are preferred as the filler to be added. These fillers may be surface-treated or non-surface-treated, and only one species thereof may be added or a plurality of species thereof may be added in admixture. For improving the workability (releasability, etc.), the particle diameter of the balloons is preferably not larger than 0.1 mm and, for rendering the cured product surface matted, it is preferably 5 to 300 µm.

The curable composition of the present invention, which gives cured products excellent in chemical resistance, is suited for use, in particular, as a sealant, adhesive or like composition for siding boards in ceramic and like systems and for housing outside-wall joints and outside-wall tiles.

On the occasion of use in such fields of application, the cured products obtained appear or exist on the joints or like observable surfaces and, therefore, it is desirable that the cured product design be in harmony with the outside wall design. In recent years, in particular, the sputtering coating and the addition of colored aggregates, among others, have been employed for providing luxurious outside walls, so that the designs of cured products are becoming more and more important.

For obtaining luxurious designs, a scaly or granular substance is incorporated in the curable composition of the present invention. The addition of a granular substance gives sandy or sandstone-like rough surfaces, and the addition of a scaly substance gives surfaces rendered uneven due to scales.

The cured products obtained are in harmony with luxurious outside walls and are excellent in chemical resistance, so that the luxurious appearance thereof can be maintained for a long period of time.

The scaly or granular substance is not particularly restricted but includes, for example, one disclosed in Japanese Kokai Publication H09-53063, and the diameter thereof is properly selected according to the outside-wall material and design and is preferably not smaller than 0.1 mm, and more preferably 0.1 to 5.0 mm. In the case of a scaly substance, the thickness of scales is preferably ¹⁄₁₀ to ⅕ (0.01 to 1.00 mm) of the diameter.

The addition level of the scaly or granular substance is properly selected according to the size of the scaly or granular substance, the outside-wall material and design and other factors; preferably, the addition level is 1 to 200 parts by weight per 100 parts by weight of the curable composition.

The material of the scaly or granular substance is not particularly restricted but includes natural products such as silica sand and mica, synthetic rubbers, synthetic resins, and inorganic materials such as alumina. These may be appropriately colored according to the outside-wall material, design, and so forth so that the design quality of the composition applied to joints and so forth may be enhanced.

Preferred methods of finishing are those disclosed in Japanese Kokai Publication H09-53063 and the like.

The scaly or granular substance may be incorporated in advance in the curable composition or may be admixed with the curable composition of the occasion of use thereof.

It is also possible, for the same purposes, to add balloons (preferably having an average particle diameter of not smaller than 0.1 mm) to the curable composition, thereby providing the resulting cured product surface with a coarse feel such as a sandy or sandstone feel and, further, contributing to weight reduction. The "balloons" are spherical hollow fillers.

The balloons are not particularly restricted but include, for example, those disclosed in Japanese Kokai Publications H10-251618, H02-129262, H04-8788, H04-173867, H05-1225, H07-113073, H09-53063, 2000-154368 and 2001-164237 and WO 97/05201.

As the material of balloons, there may be mentioned inorganic materials such as glass, shirasu and silica; and organic materials such as phenol resins, urea resins, polystyrene and Saran. Mention may further be made of composite materials of an inorganic material and an organic material; and laminates including a plurality of layers. These may be used singly or a plurality species thereof may be used in combination.

It is also possible to use balloons subjected to surface coating treatment, treatment with various surface treatment agents or some other treatment; as typical examples, there may be mentioned organic balloons coated with calcium carbonate, talc, titanium oxide or the like, and inorganic balloons surface-treated with an adhesiveness-imparting agent.

Further, the balloons preferably have a particle diameter of not smaller than 0.1 mm, more preferably 0.2 mm to 5.0 mm, and particularly preferably 0.5 mm to 5.0 mm. When the diameter is smaller than 0.1 mm, the addition even in large amounts only increases the viscosity of the composition, sometimes failing to provide the resulting cured products with a coarse feel.

The addition level of the balloons can be properly selected according to the intended decorative effect; it is preferred that balloons having a particle diameter of not smaller than 0.1 mm be added in an amount such that the volume concentration thereof in the curable composition amounts to 5 to 25% by volume, more preferably 8 to 22% by volume. When the volume concentration of balloons is below 5% by volume, the desired coarse feel tends to become lost. At level exceeding 25% by volume, the viscosity of the curable composition increases and the workability thereof tends to become poor; further, the modulus of the cured products increases and the fundamental performance characteristics of the sealant or adhesive tend to become impaired.

On the occasion of adding balloons, it is also possible to add, in combination, such an anti-slip agent as the one disclosed in Japanese Kokai Publication 2000-154368 or such an amine compound capable of rendering the resulting cured product surface uneven and matted as the one disclosed in Japanese Kokai Publication 2001-164237. Preferred as the amine compound mentioned above are primary and/or secondary amines having a melting point of 35° C. or higher.

Also usable as the balloons are thermally expandable minute hollow particles disclosed in Japanese Kokai Publication 2004-51701 or 2004-66749, for instance. The "thermally expandable minute hollow particles" are spherical plastic bodies made of a polymer shell material (vinylidene chloride type copolymer, acrylonitrile type copolymer or vinylidene chloride-acrylonitrile copolymer) with a low-boiling compound such as a $C_{1-5}$ hydrocarbon as spherically enclosed therein.

By adding thermally expandable minute hollow particles to the curable composition of the present invention, it becomes possible to obtain an adhesive composition which, when no more required, can be peeled off with ease only by heating without destruction of the adherend materials, and can be thermally removed without using any organic solvent at all. This is based on the mechanism such that when the adhesive portion is heated, the gas pressure inside the shells of the thermally expandable minute hollow particles increases and the polymer shell material is softened and dramatically expanded to cause peeling at the adhesive interface.

When the curable composition of the present invention contains sealant-cured particles as well, the cured products obtained can have an uneven rough surface and, thus, the decorative feature thereof can be improved. The preferred diameter, blending level, material and the like of the sealant-cured particles are disclosed in Japanese Kokai Publication 2001-115142, and the diameter is preferably 0.1 to 1 mm, more preferably 0.2 to 0.5 mm. The blending level is preferably 5 to 100 parts by weight, and more preferably 20 to 50 parts by weight, per 100 parts by weight of the curable composition. The material is not particularly restricted but may be any of the materials used in sealing compositions; thus, mention may be made of urethane resins, silicones, modified silicones and polysulfide rubbers, for example. Among those mentioned above, modified silicone type sealant-cured particles are preferred.

To the curable composition of the present invention, there can be added a silicate, if necessary. The silicate acts as a crosslinking agent on the organic polymer (A) and consequently functions to bring about improvements in the restorability, durability and creep resistance of the cured products obtained.

Further, the addition of a silicate brings about improvements in the adhesiveness and water-resistant adhesiveness and in the bond durability under high-temperature and high-pressure conditions, of the cured products obtained. The silicate is not particularly restricted but includes, for example, tetraalkoxysilanes or partial hydrolysis condensation products derived therefrom; more specifically, there may be mentioned tetraalkoxysilanes (tetraalkyl silicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane and tetra-t-butoxysilane as well as partial hydrolysis condensation products derived therefrom.

The addition level of the silicate is preferably 0.1 to 20 parts by weight, and more preferably 0.5 to 10 parts by weight, per 100 parts by weight of the organic polymer (A).

The tetraalkoxysilane-derived partial hydrolysis condensation product mentioned above is not particularly restricted but includes, for example, products derived from tetraalkoxysilanes by addition of water thereto to cause partial hydrolysis and condensation.

The addition of a tetraalkoxysilane-derived partial hydrolysis condensation product is preferred since such condensation product produces significant improvements in restorability, durability and creep resistance of the cured products obtained as compared with the corresponding composition containing a tetraalkoxysilane added thereto.

Commercially available as the tetraalkoxysilane-derived partial hydrolysis condensation product are, for example, Methyl Silicate 51 and Ethyl Silicate 40 (both being products of Colcoat Co., Ltd.); these can be used as additives.

For the purpose of inhibiting the surface curability of the curable composition from changing during storage, it is preferred that the silicate be selected from among those in which the silicon atom-bound hydrolyzable groups are the same as the hydrolyzable groups in the reactive silyl group occurring in the organic polymer (A). Thus, when the organic polymer (A) contains methoxysilyl groups, a methoxysilyl group-containing silicate is preferably selected and, when the organic polymer (A) contains ethoxysilyl groups, an ethoxysilyl group-containing silicate is preferably selected.

Addition of a polymeric plasticizer containing a polymer component in the molecule is preferred since such addition makes it possible to maintain the initial properties of the cured products obtained for a long period of time and, further, improve the drying properties (also referred to as applicability) of an alkyd paint when it is applied to the cured products obtained.

The polymeric plasticizer is not particularly restricted but includes: vinyl polymers obtained by polymerization of vinyl monomers by various methods; polyalkylene glycol esters such as diethylene glycol dibenzoate, triethylene glycol dibenzoate and pentaerythritol esters; polyester type plasticizers derived from a dibasic acid such as sebacic acid, adipic acid, azelaic acid and phthalic acid and a dihydric alcohol such as ethylene glycol, diethylene glycol, triethylene glycol, propylene glycol and dipropylene glycol; polyether polyols such as polyethylene glycol, polypropylene glycol and polytetramethylene glycol, each having a molecular weight of not lower than 500, preferably not lower than 1000, or polyether derivatives derived from such polyether polyols by esterification or etherification of one or more hydroxyl groups therein; polystyrenes such as polystyrene and poly-α-methylstyrene; polybutadiene, polybutene, polyisobutylene, butadiene-acrylonitrile copolymers, polychloroprene and the like.

In the curable composition of the present invention, there can be incorporated a tackifier, if necessary. The tackifier resin is not particularly restricted provided that it is one in common use, irrespective of whether it occurs as a solid or liquid at ordinary temperature. For example, there may be mentioned styrene block copolymers, hydrogenation products derived therefrom, phenol resins, modified phenol resins (e.g. cashew oil-modified phenol resins, tall oil-modified phenol resins), terpene phenol type resins, xylene-phenol type resins, cyclopentadiene-phenol type resins, coumarone-indene type resins, rosin type resins, rosin ester type resins, hydrogenated rosin ester type resins, xylene type resins, low-molecular-weight polystyrene type resins, styrene copolymer resins, petroleum resins (e.g. C5 hydrocarbon type resins, C9 hydrocarbon type resins, C5C9 hydrocarbon copolymer resins), hydrogenated petroleum resins, terpene type resins, DCPD resins, and petroleum resins. These may be added singly or a plurality thereof may be added in combination.

The styrene block copolymers and hydrogenation products derived therefrom mentioned above are not particularly restricted but include, for example, styrene-butadiene-styrene block copolymers (SBSs), styrene-isoprene-styrene block copolymers (SISs), styrene-ethylenebutylene-styrene block copolymers (SEBSs), styrene-ethylenepropylene-styrene block copolymers (SEPSs) and styrene-isobutylene-styrene block copolymers (SIBSs).

The addition level of the tackifier is preferably 5 to 1,000 parts by weight, and more preferably 10 to 100 parts by weight, per 100 parts by weight of the organic polymer (A).

In the curable composition of the present invention, there can be incorporated a solvent or diluent, if necessary. The solvent or diluent is not particularly restricted but includes, for example, aliphatic hydrocarbons, aromatic hydrocarbons, alicyclic hydrocarbons, halogenated hydrocarbons, alcohols, esters, ketones and ethers. These may be added singly or a plurality thereof may be added in combination.

When a solvent or diluent is added, the solvent or diluent preferably has a boiling point of 150° C. or higher, and more preferably 200° C. or higher, so that the volatile components may be inhibited from dissipating into the air on the occasion of indoor use of the curable composition.

In the curable composition of the present invention, there may be incorporated a physical property modifier, if necessary. The physical property modifier functions so as to adjust the tensile properties and hardness of the resulting cured products. The physical property modifier is not particularly restricted but includes, for example, alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and γ-glycidoxypropylmethyldiisopropenoxysilane; functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; and polysiloxanes. These may be added singly or a plurality thereof may be added in admixture.

Among such physical property modifiers, those which form, upon hydrolysis, a compound containing a monovalent silanol group in the molecule are preferred since they are effective in reducing the modulus of the resulting cured products without worsening the surface stickiness thereof; among them, those which form, upon hydrolysis, trimethylsilanol are more preferred.

The compounds which form, upon hydrolysis, a compound containing a monovalent silanol group in the molecule are not particularly restricted but include: those compounds disclosed in Japanese Kokai Publication H05-117521; compounds derived from an alkyl alcohol such as hexanol, octanol and decanol, and capable of forming, upon hydrolysis, such an organosilicon compound represented by $R_3SiOH$ as trimethylsilanol; and those compounds disclosed in Japanese Kokai Publication H11-241029 which are compounds derived from a polyhydric alcohol containing 3 or more hydroxyl groups in each molecule, for example trimethylolpropane, glycerol, pentaerythritol or sorbitol, and capable of forming, upon hydrolysis, such an organosilicon compound represented by $R_3SiOH$ as trimethylsilanol.

Further, mention may be made of those compounds disclosed in Japanese Kokai Publication H07-258534 which are derived from an oxypropylene polymer and capable of forming, upon hydrolysis, such an organosilicon compound represented by $R_3SiOH$ as trimethylsilanol and, further, those compounds disclosed in Japanese Kokai Publication H06-279693 which contain a crosslinkable hydrolyzable silyl group and a silyl group capable of forming, upon hydrolysis, a monovalent silanol group-containing compound.

The addition level of the physical property modifier is preferably 0.1 to 20 parts by weight, and more preferably 0.5 to 10 parts by weight, per 100 parts by weight of the organic polymer (A).

The epoxy group-containing compound is not particularly restricted but includes, for example, epoxidized unsaturated fats and oils; epoxidized unsaturated fatty acid esters; alicyclic epoxy compounds; epichlorohydrin derivatives and like compounds; and mixtures thereof. More specifically, there may be mentioned epoxidized soybean oil, epoxidized linseed oil, bis(2-ethylhexyl)-4,5-epoxycyclohexane-1,2-dicarboxylate (E-PS), epoxyoctyl stearate, epoxybutyl stearate and the like. Among these, E-PS is preferred.

The addition level of the epoxy compound is preferably 0.5 to 50 parts by weight per 100 parts by weight of the organic polymer (A).

In the curable composition of the present invention, there can be added a photocurable substance, if necessary. The photocurable substance is a substance capable of undergoing, under the action of light, chemical changes in molecular structure in a short period of time which lead to changes in physical properties such as curing. The addition of a photocurable substance to the curable composition results in the formation of a photocurable substance-based layer on the surface of the cured products obtained and thus in improvements in the stickiness and weather resistance of the cured products.

The photocurable substance is not particularly restricted but includes those known in the art, such as organic monomers, oligomers and resins, and compositions containing any of them; for example, there may be mentioned unsaturated acrylic compounds, vinyl cinnamate polymers and azidized resins.

As the unsaturated acrylic compounds, there may be mentioned monomers, oligomers, or mixtures thereof, containing one or a plurality of acrylic or methacrylic unsaturated groups in each molecule, and, specifically, propylene (or butylene or ethylene)glycol di(meth)acrylate, neopentyl glycol di(meth)acrylate and like monomers or oligoesters thereof having a molecular weight not exceeding 10,000. More specifically, there may be mentioned, for example, such special acrylates as (bifunctional) Aronix M-210, Aronix M-215, Aronix M-220, Aronix M-233, Aronix M-240 and Aronix M-245; (trifunctional) Aronix M-305, Aronix M-309, Aronix M-310, Aronix M-315, Aronix M-320 and Aronix M-325; and (polyfunctional) Aronix M-400 (all Aronix products being available from Toagosei Co., Ltd.). Among these, acrylic functional group-containing compounds are preferred, and compounds containing, on an average, 3 or more acrylic functional groups in each molecule are more preferred.

The vinyl cinnamate polymers include photosensitive resins having cinnamoyl groups as photosensitive groups, which are compounds resulting from esterification of polyvinyl alcohol with cinnamic acid, and many other derivatives of vinyl cinnamate polymers.

The azidized resins are known as photosensitive resins in which azide groups are photosensitive groups and include rubber photosensitive solutions generally containing a diazide compound added as a photosensitizer and, further, those detailed examples are described in "Kankosei Jushi (Photosensitive Resins)" (published Mar. 17, 1972 by Insatsu Gakkai Shuppanbu Ltd., p. 93 ff., p. 106 ff., and p. 117 ff.). These may be used either singly or in admixture, if necessary together with a sensitizer.

In some cases, the addition of a sensitizer such as ketones and a nitro compound or an accelerator such as amines enhances the effect.

The addition level of the photocurable substance is preferably 0.1 to 20 parts by weight, and more preferably 0.5 to 10 parts by weight, per 100 parts by weight of the organic polymer (A). At levels of 0.1 parts by weight or below, the effect of enhancing the weather resistance of the cured products obtained is very little and, at levels of 20 parts by weight or above, the cured products obtained are too hard, tending to undergo cracking or the like.

In the curable composition of the present invention, there can be incorporated an oxygen-curable substance, if necessary. The oxygen-curable substance can be cured upon reaction with oxygen in the air, and the addition of an oxygen-curable substance makes it possible to reduce the stickiness of the cured product surface and to prevent dirt and dust from adhering to the surface through the formation of a cured layer in the vicinity of the cured product surface obtained.

The oxygen-curable substance is not particularly restricted provided that it is one of the compounds containing an unsaturated compound capable of reacting with oxygen in the air; thus, for example, there may be mentioned drying oils such as tung oil and linseed oil, and various alkyd resins obtained by modifying such compounds; drying oil-modified acrylic polymers, epoxy type resins, silicone type resins; liquid polymers obtained by polymerizing or copolymerizing such a diene compound(s) as butadiene, chloroprene, isoprene and 1,3-pentadiene, for example 1,2-polybutadiene, 1,4-polybutadiene and C5-C8 diene polymers; liquid copolymers obtained by copolymerizing such a diene compound with a vinyl compound, such as acrylonitrile and styrene, copolymerizable with the diene compound, in a manner such that the diene compound serve as the main component, for example NBR and SBR; and, further, various modifications thereof (maleinated modifications, boiled oil modifications, etc.). Among those mentioned above, tung oil and liquid diene type polymers are preferred. The oxygen-curable substance to be added may include a single species or a combination of a plurality of species.

When a catalyst and/or metal dryer which are capable of promoting the curing reaction are added in admixture with the oxygen-curable substance, the effect may be enhanced. The catalyst and metal dryer for promoting the curing reaction are not particularly restricted but include, for example, metal salts such as cobalt naphthenate, lead naphthenate, zirconium naphthenate, cobalt octylate and zirconium octylate, and amine compounds.

The addition level of the oxygen-curable substance is preferably 0.1 to 20 parts by weight, and more preferably 0.5 to 10 parts by weight, per 100 parts by weight of the organic polymer (A). At addition levels below 0.1 parts by weight, the effect of improving the stain resistance of the cured products obtained tends to become insufficient and, at levels exceeding 20 parts by weight, the tensile properties and the like of the cured products obtained tend to become impaired.

Further, the oxygen-curable substance is preferably added in admixture with a photocurable substance, as disclosed in Japanese Kokai Publication H03-160053.

In the curable composition of the present invention, there can be incorporated an antioxidant, if necessary. By adding an antioxidant, it becomes possible to enhance the thermal stability of the cured products obtained.

The antioxidant is not particularly restricted but includes hindered phenol type, monophenol type, bisphenol type and polyphenol type antioxidants. Among these, hindered phenol type antioxidants are preferred. Also preferred are hindered amine type light stabilizers such as Tinuvin 622LD and Tinuvin 144; Chimassorb 944LD and Chimassorb 119FL (all four being products of Chiba Specialty Chemicals Inc.); ADK STAB LA-57, ADK STAB LA-62, ADK STAB LA-67, ADK STAB LA-63 and ADK STAB LA-68 (all five being products of Adeka Corporation); and Sanol LS-770, Sanol LS-765, Sanol LS-292, Sanol LS-2626, Sanol LS-1114 and Sanol LS-744 (all six being product of Sankyo Lifetech Co., Ltd.). Specific examples of the antioxidants are disclosed also in Japanese Kokai Publications H04-283259 and H09-194731.

The addition level of the antioxidant is preferably 0.1 to 10 parts by weight, and more preferably 0.2 to 5 parts by weight, per 100 parts by weight of the organic polymer (A).

In the curable composition of the present invention, there can be incorporated a light stabilizer, if necessary. By adding a light stabilizer, the cured products obtained can be prevented from undergoing photooxidative degradation.

The light stabilizer is not particularly restricted but includes benzotriazole type, hindered amine type and benzoate type compounds. Among these, hindered amine type light stabilizers are preferred.

The addition level of the light stabilizer is preferably 0.1 to 10 parts by weight, and more preferably 0.2 to 5 parts by weight, per 100 parts by weight of the organic polymer (A) A specific example of the light stabilizer is disclosed in Japanese Kokai Publication H09-194731 as well.

When such a photocurable substance as an unsaturated acrylic compound is added to the curable composition of the present invention, a tertiary amine group-containing hindered amine type light stabilizer is preferably added as disclosed in Japanese Kokai Publication H05-70531 since, then, the storage stability of the curable composition is improved.

The tertiary amine group-containing hindered amine type light stabilizer is not particularly restricted but includes Tinuvin 622LD, Tinuvin 144 and Chimassorb 119FL (all three being products of Ciba Specialty Chemicals Inc.); ADK STAB LA-57, LA-62, LA-67 and LA-63 (all four being products of Adeka Corporation); and Sanol LS-765, LS-292, LS-2626, LS-1114 and LS-744 (all five being products of Sankyo Lifetech Co., Ltd.)

To the curable composition of the present invention, there can be added an ultraviolet absorber, if necessary. When an ultraviolet absorber is added to the curable composition, the surface weather resistance of the cured products obtained is improved.

The ultraviolet absorber is not particularly restricted but includes benzophenone type, benzotriazole type, salicylate type, substituted tolyl type and metal chelate type compounds.

Among these, benzotriazole type ultraviolet absorbers are preferred.

The addition level of the ultraviolet absorber is preferably 0.1 to 10 parts by weight, and more preferably 0.2 to 5 parts by weight, per 100 parts by weight of the organic polymer (A).

The antioxidant, light stabilizer and ultraviolet absorber mentioned above are preferably added in combination to the curable composition and, for example, a phenol type or hindered phenol type antioxidant, a hindered amine type light stabilizer and a benzotriazole type ultraviolet absorber are preferably added in admixture to the curable composition.

An epoxy resin can be added, if necessary, to the curable composition of the present invention. The addition of an epoxy resin improves the adhesiveness of the obtained cured products and, therefore, the curable composition added with an epoxy resin is favorably used as an adhesive, and in particular, as an adhesive for outside-wall tiles.

The epoxy resin is not particularly restricted but includes, for example, epichlorohydrin-bisphenol A-type epoxy resins, epichlorohydrin-bisphenol F-type epoxy resins, flame retardant epoxy resins such as glycidyl ethers of tetrabromobisphenol A, novolak-type epoxy resins, hydrogenated bisphenol A-type epoxy resins, bisphenol A propylene oxide adduct glycidyl ether-type epoxy resins, p-oxybenzoic acid glycidyl ether ester-type epoxy resins, m-aminophenol epoxy resins, diaminodiphenylmethane epoxy resins, urethane-modified epoxy resins, various alicyclic epoxy resins, N,N-diglycidylaniline, N,N-diglycidyl-o-toluidine, triglycidyl isocyanurate, polyalkylene glycol diglycidyl ethers, glycidyl ethers of polyhydric alcohols such as glycerol, hydantoin-type epoxy resins, and epoxidized unsaturated polymers derived from petroleum resins or the like. Among these, an epoxy resin having at least two epoxy groups per molecule is preferable since the reactivity of the curable composition is enhanced and the resulting cured product easily forms a three-dimensional network structure. Bisphenol A-type epoxy resins, novolak-type epoxy resins and the like are more preferable.

The addition level of the epoxy resin depends on the application of the curable composition, etc. For example, in order to improve impact resistance, flexibility, toughness, peel strength or the like of the epoxy resin cured product, the organic polymer (A) is added preferably in an amount of 1 to 100 parts by weight, and more preferably in an amount of 5 to 100 parts by weight, per 100 parts by weight of the epoxy resin. On the other hand, in order to improve strength of the cured product of the organic component (A), the epoxy resin is added preferably in an amount of 1 to 200 parts by weight, and more preferably in an amount of 5 to 100 parts by weight, per 100 parts by weight of the organic polymer (A).

When the epoxy resin is added to the curable composition of the present invention, it is preferable to use a curing agent for epoxy resins together.

The curing agent for epoxy resins is not particularly restricted as long as it functions to cure an epoxy resin. For example, mention may be made of primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, and amine-terminated polyether; tertiary amines such as 2,4,6-tris (dimethylaminomethyl)phenol and tripropylamine, and salts of these tertiary amines; polyamide resins; imidazoles; dicyandiamides; boron trifluoride complex compounds; carboxylic anhydrides such as phthalic anhydride, hexahydrophthalic anhydride, tetrahydrophthalic anhydride, dodecynylsuccinic anhydride, pyromellitic anhydride, and chlorendic anhydride; alcohols; phenols; carboxylic acids; and diketone complexes of aluminum or zirconium; and like compounds. These curing agents may be used singly or a plurality thereof may be used in combination.

The addition level of the curing agent for epoxy resins is preferably 0.1 to 300 parts by weight per 100 parts by weight of the epoxy resin.

Among the curing agents for epoxy resins, a ketimine compound is preferably used because it is possible to obtain a one-pack type curable composition. The ketimine compound is stable in the absence of moisture, and on the other hand, with moisture, it is decomposed into a primary amine and a ketone. The resultant primary amine functions as a curing agent capable of curing an epoxy resin at room temperature. Such ketimine compounds include those obtained by condensation reaction between an amine compound and a carbonyl compound.

The amine compound and carbonyl compound used for producing the ketimine compound are not particularly restricted but include publily known compounds. Examples of the amine compound include: diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, and p,p'-biphenylenediamine; polyvalent amines such as 1,2,3-triaminopropane, triaminobenzene, tris(2-aminoethyl)amine, and tetrakis (aminomethyl)methane; polyalkylene polyamines such as diethylenetriamine, triethylenetriamine, and tetraethylenepentamine; polyoxyalkylene polyamines; aminosilanes such as γ-aminopropyltriethoxysilane, N-(β-aminoethyl)-γ-aminopropyltrimethoxysilane, and N-(β-aminoethyl)-γ-aminopropylmethyldimethoxysilane; and the like.

Examples of the carbonyl compound include: aldehydes such as acetaldehyde, propionaldehyde, n-butylaldehyde, isobutylaldehyde, diethylacetaldehyde, glyoxal, and benzaldehyde; cyclic ketones such as cyclopentanone, trimethylcyclopentanone, cyclohexanone, and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, and diisobutyl ketone; β-dicarbonyl compounds such as acetylacetone, methyl acetoacetate, ethyl acetoacetate, dimethyl malonate, diethyl malonate, methyl ethyl malonate, and dibenzoylmethane; and the like.

Examples of the ketimine compound having an imino group include those obtained by reacting the imino group therein with: styrene oxide; glycidyl ether such as butyl glycidyl ether and allyl glycidyl ether; glycidyl ester; and the like.

Either a single species among these ketimine compounds may be added or a combination of a plurality thereof may be added.

The addition level of the ketimine compound varies according to kinds of epoxy resins and ketimines; generally, the addition level is preferably 1 to 100 parts by weight per 100 parts by weight of epoxy resins.

To the curable composition of the present invention, there can be added a flame retardant, if necessary. The flame retardant is not particularly restricted; thus, for example, phosphorus type flame retardants such as ammoniumpolyphosphate and tricresyl phosphate; and such flame retardants as aluminum hydroxide, magnesium hydroxide and thermally expandable graphite can be added to the curable composition. The flame retardant to be added thereto may comprise a single species or a combination of a plurality of species.

The addition level of the flame retardant is preferably 5 to 200 parts by weight, and more preferably 10 to 100 parts by weight, per 100 parts by weight of the organic polymer.

To the curable composition of the present invention may be added, if necessary, various additives other than those mentioned above for the purpose of adjusting various physical properties of the curable composition or of the cured products to be obtained. As such additives, there may be mentioned, for example, curability modifiers, radical inhibitors, metal deactivators, antiozonants, phosphorus type peroxide decomposers, lubricants, pigments, blowing agents, antitermites and antifungal agents. Specific examples of these are disclosed in publications such as Japanese Kokoku Publications H04-69659 and H07-108928, and Japanese Kokai Publications S63-254149, S64-22904 and 2001-72854. These additives may be added singly to the curable composition or a plurality thereof may be added in combination to the curable composition.

In cases where the curable composition is of the one-pack type, the composition contains all components as mixed up in advance and, thus, curing may proceed during storage if moisture is present in formulation components. Therefore, those formulation components which contain moisture are preferably dehydrated and dried prior to addition or dehydrated during compounding and kneading by reducing the pressure, for instance.

When the curable composition is of the two-pack type, it is not necessary to incorporate the curing catalyst in the main component having a reactive silyl group-containing organic polymer and, therefore, even if some moisture is contained in the formulation components, the risk of the progress of curing (gelation) is low; in cases where long-term storage stability is required, however, it is preferred that the formulation components be dehydrated or dried.

As for the method of dehydrating or drying, the method comprising drying by heating and the method comprising dehydrating under reduced pressure are preferred in cases where the formulation components are solids such as powders and, in cases where they are liquids, the vacuum dehydration method and the dehydration method using a synthetic zeolite, activated alumina, silica gel, quick lime, magnesium oxide or the like are preferred and, further, the dehydration method comprising adding an alkoxysilane compound such as n-propyltrimethoxysilane, vinyltrimethoxysilane, vinylmethyldimethoxysilane, methyl silicate, ethyl silicate, γ-mercaptopropylmethyldimethoxysilane, γ-mercaptopropylmethyldiethoxysilane and γ-glycidoxypropyltrimethoxysilane; an oxazolidine compound such as 3-ethyl-2-methyl-2-(3-methylbutyl)-1,3-oxazolidine; or an isocyanate compound to the curable composition and allowing the same to react with water contained in the formulation components is also preferred. In this way, the storage stability of the curable composition is improved by the addition of such an alkoxysilane compound, oxazolidine compound or isocyanate compound.

In using vinyltrimethoxysilane or a like alkoxysilane compound capable of reacting with water for the purpose of drying, the addition level thereof is preferably 0.1 to 20 parts by weight, and more preferably 0.5 to 10 parts by weight, per 100 parts by weight of the organic polymer (A).

The method of preparing the curable composition of the present invention is not particularly restricted but there may be employed, for example, such a method known in the art as a method comprising combining the formulation components mentioned above and kneading the resulting mixture at ordinary temperature or with heating using a mixer, roller, kneader, or the like, or a method comprising dissolving the formulation components using small portions of an appropriate solvent and then mixing up the solutions.

When exposed to the air, the curable composition of the present invention forms a three-dimensional network structure under the action of atmospheric moisture and thus is cured to give a solid having rubber elasticity.

The curable composition of the present invention can be suitably used in such fields of application as pressure-sensitive adhesives; sealants for buildings, ships, automobiles, roads, etc.; adhesives; impression materials; vibration-proof materials; damping materials; soundproof materials; expanded/foamed materials; coating compositions; spray coatings, etc. Among such fields of application, the use as sealants or adhesives is more preferred since the cured products obtained are excellent in flexibility and adhesiveness.

The curable composition of the present invention can also be used in such various fields of application as back cover sealants for a solar cell and like electric and electronic part materials; insulating cover materials for electric wires and cables and other electric insulating materials; elastic adhesives; contact adhesives; spray sealants; crack repair materials; tiling adhesives; powder coating compositions; casting materials; rubber materials for medical use; pressure-sensitive adhesives for medical use; sealants for medical devices; food packaging materials; joint sealants for siding boards and other exterior materials; coating materials; primers; electromagnetic wave shielding conductive materials; thermally conductive materials; hot melt materials; potting agents for electrics and electronics; films; gaskets; various molding materials; rustproof and waterproof sealants for wired glass and laminated-glass edges (cut end faces); liquid sealants for use in automotive parts, electrical machinery parts, various machinery parts, etc.

Further, the curable composition can also be used as various types of hermetically sealants and adhesives since it, either alone or with the aid of a primer, can adhere to a wide range of substrates such as glass, ceramics, wood, metals and resin moldings.

The curable composition of the present invention can also be used in the form of interior panel adhesives, exterior panel adhesives, tiling adhesives, stone pitching adhesives, ceiling finishing adhesives, floor finishing adhesives, wall finishing adhesives, vehicle panel adhesives, electric, electronic and precision apparatus assembling adhesives, direct glazing sealants, double glazing sealants, sealants for SSG systems, or building working joint sealants.

EXAMPLES

The following examples and comparative examples illustrate the present invention more specifically. These are, however, by no means limitative of the scope of the present invention.

Synthesis Example 1

Propylene oxide was polymerized using a 1/1 (in weight ratio) mixture of polyoxypropylene diol with a molecular weight of about 2,000 and polyoxypropylene triol with a molecular weight of about 3,000 as an initiator and a zinc hexacyanocobaltate glyme complex catalyst to give polypropylene oxide having a number average molecular weight of about 19,000 (polystyrene-equivalent molecular weight measured by using a TOSOH model HLC-8120 GPC solvent delivery system and a TOSOH model TSK-GEL H type column, with THF as a solvent). Thereto was then added a methanol solution of NaOMe in an amount of 1.2 equivalents relative to the hydroxyl groups of that hydroxyl-terminated polypropylene oxide, the methanol was distilled off and, further, allyl chloride was added to the residue for conversion of each terminal hydroxyl group to an allyl group. In the above manner, allyl group-terminated polypropylene oxide with a number average molecular weight of about 19,000 was obtained.

To 100 parts by weight of the crude allyl group-terminated polypropylene oxide obtained were added 300 parts by weight of n-hexane and 300 parts by weight of water and, after mixing with stirring, the water was removed by centrifugation. The hexane solution obtained was further mixed with 300 parts by weight of water with stirring, and after the water was removed again by centrifugation, the hexane was removed by volatilization under reduced pressure to give purified allyl group-terminated polypropylene oxide (hereinafter, referred to as an "allyl polymer"). The obtained allyl polymer (100 parts by weight) was reacted with 1.35 parts by weight of methyldimethoxysilane at 90° C. for 5 hours by adding 150 ppm of an isopropanol solution of a platinum-vinylsiloxane complex (platinum content: 3% by weight) thereto as a catalyst to give a methyldimethoxysilyl group-terminated polypropylene oxide (A-1). As a result of $^1$H-NMR measurement (made in $CDCl_3$ solvent using a Nippon Denshi (JEOL Ltd.) model JNM-LA400), the average number of terminal methyldimethoxysilyl groups per molecule was found to be about 1.7.

Synthesis Example 2

Propylene oxide was polymerized using polyoxypropylene triol with a molecular weight of about 3,000 as an initiator and a zinc hexacyanocobaltate glyme complex catalyst to give polypropylene oxide (P-2) having a number average molecular weight of about 26,000 (polystyrene-equivalent molecular weight measured by using the same method as in Synthesis Example 1). Thereto was then added a methanol solution of NaOMe in an amount of 1.2 equivalents relative to the hydroxyl groups of the hydroxyl-terminated polypropylene oxide, the methanol was distilled off and, further, allyl chloride was added to the residue for conversion of each terminal hydroxyl group to an allyl group. The unreacted allyl chloride was removed by volatilization under reduced pressure. To 100 parts by weight of the crude allyl group-terminated polypropylene triol obtained were added 300 parts by weight of n-hexane and 300 parts by weight of water and, after mixing with stirring, the water was removed by centrifugation. The hexane solution obtained was further mixed with 300 parts by weight of water with stirring, and after the water was removed again by centrifugation, the hexane was removed by volatilization under reduced pressure. In the above manner, the allyl group-terminated trifunctional polypropylene oxide (P-3) with a number average molecular weight of about 26,000 was obtained. Into a 1 L autoclave were introduced 100 parts by weight of the allyl group-terminated trifunctional polypropylene oxide obtained and 2 parts by weight of hexane, the mixture was subjected to azeotropic dehydration at 90° C., hexane was distilled off under reduced pressure, and thereafter nitrogen substitution was performed. The obtained product was reacted with 1.28 parts by weight of trimethoxysilane at 90° C. for 5 hours by adding 150 ppm of an isopropanol solution of a platinum-divinyldisiloxane complex (platinum content: 3% by weight) thereto as a catalyst to give a terminated polyoxypropylene polymer (A-2). As a result of the same $^1$H-NMR measurement as above, the average number of terminal trimethoxysilyl groups per molecule was found to be 1.8.

Synthesis Example 3

To polyoxypropylene triol with a molecular weight of about 3,000 was added a methanol solution of NaOMe in an amount of 1.2 equivalents, the methanol was distilled off and, further, allyl chloride was added to convert the terminal hydroxyl groups to allyl groups. The unreacted allyl chloride was removed by volatilization under reduced pressure to give an allyl group-terminated polypropylene glycol.

Mix Example 1

To 8 parts by weight of 1-(o-tolyl)biguanide (product of Ouchi Shinko Chemical Industrial Co., Ltd., trade name: Nocceler BG) were added 16 parts by weight of tripropylene glycol n-butyl ether (product of Dow Chemical Japan Ltd., trade name: DOWANOL TPnB) and 4 parts by weight of γ-aminopropyltrimethoxysilane (product of Dow Corning Toray Co., Ltd., trade name: A-1110). After mixing up and leaving for 30 minutes in an oven at 80° C., a colorless and transparent liquid (mixture A) was obtained.

Mix Example 2

To 6 parts by weight of 1-phenylguanidine (product of Nippon Carbide Industries Co., Inc.) were added 12 parts by weight of tripropylene glycol n-butyl ether and 3 parts by weight of γ-aminopropyltrimethoxysilane. After mixing up and leaving for 30 minutes in an oven at 80° C., a yellow and transparent liquid (mixture B) was obtained.

Mix Example 3

To 8 parts by weight of 1-(o-tolyl)biguanide was added 16 parts by weight of methyl ethyl ketone (product of Wako Pure Chemical Industries, Ltd., reagent). After mixing up, a colorless and transparent liquid (mixture C) was obtained.

Mix Example 4

To 8 parts by weight of 1-(o-tolyl)biguanide was added 16 parts by weight of ethanol (product of Wako Pure Chemical Industries, Ltd., reagent). After mixing up, a colorless and transparent liquid (mixture D) was obtained.

Mix Example 5

To 8 parts by weight of 1-(o-tolyl)biguanide was added 16 parts by weight of polyoxypropylene diol with a molecular weight of 3,000 (product of Mitsui Takeda Chemicals, trade name: Actcol P-23). After mixing up and leaving for 30 minutes in an oven at 80° C., a white turbid liquid (mixture E), not a transparent liquid, was obtained. After leaving at room temperature, a white precipitate occurred.

Mix Example 6

To 8 parts by weight of 1-(o-tolyl)biguanide were added 16 parts by weight of polyoxypropylene diol with a molecular weight of 3,000 and 8 parts by weight of N,N-diethyl-1,3-propanediamine (product of Wako Pure Chemical Industries, Ltd., reagent). After mixing up and leaving for 30 minutes in an oven at 80° C., a yellow and transparent liquid (mixture F) was obtained.

Example 1

Surface-treated colloidal calcium carbonate (120 parts by weight; product of Shiraishi Kogyo, trade name: Hakuenka CCR), 39 parts by weight of a polypropylene glycol type plasticizer with a molecular weight of 3,000 (product of Mitsui Takeda Chemicals, trade name: Actcol P-23), 20 parts by weight of titanium oxide (white pigment) (product of Ishihara Sangyo, trade name: Tipaque R-820), 2 parts by weight of an antisagging agent (product of Kusumoto Chemicals Ltd., trade name: Disparlon 6500), 1 part by weight of a benzotriazole type ultraviolet absorber (product of Ciba Specialty Chemicals, trade name: Tinuvin 326) and 1 part by weight of a hindered amine type light stabilizer (product of Sankyo Lifetech, trade name: Sanol LS-770) were weighed and admixed with 50 parts by weight of the methyldimethoxysilyl group-terminated polyoxypropylene polymer (A-1) obtained in Synthesis Example 1 and 50 parts by weight of the trimethoxysilyl group-terminated polyoxypropylene polymer (A-2) obtained in Synthesis Example 2, and, after thorough kneading, the mixture was passed through a three-roll paint mill three times for dispersion. Thereafter, the mixture was dehydrated at 120° C. for 2 hours under reduced pressure and, after cooling to a temperature not higher than 50° C., 2 parts by weight of vinyltrimethoxysilane (product of Dow Corning Toray Co., Ltd., trade name: A-171) as a dehydrating agent, and 28 parts by weight of the mixture A obtained in Mix Example 1 were added and kneaded. After kneading under substantially water-free conditions, the resulting mixture was hermetically packed in a cartridge that is a moisture-proof container. A one-pack type curable composition was thus obtained.

Example 2

A curable composition was obtained in the same method as in Example 1 except that 3 parts by weight of oleyl monoglyceride (product of Kao Corporation, trade name: Excel O-95R) was further added to the curable composition obtained according to Example 1.

Example 3

A curable composition was obtained in the same method as in Example 1 except that the allyl group-terminated polypropylene glycol obtained in Synthesis Example 3 was used in lieu of the polypropylene glycol type plasticizer used in Example 1.

Example 4

A curable composition was obtained in the same method as in Example 1 except that the polymer (A-1) was used in an amount of 80 parts by weight, the polymer (A-2) was used in an amount of 20 parts by weight, and the polypropylene glycol type plasticizer was used in an amount of 43 parts by weight, and further, 21 parts by weight of the mixture B obtained in Mix Example 2 was used in lieu of the mixture A used in Example 1.

Comparative Example 1

A curable composition was obtained in the same method as in Example 1 except that the propylene glycol type plasticizer was used in an amount of 55 parts by weight, and 4 parts by weight of γ-aminopropyltrimethoxysilane (product of Dow Corning Toray Co., Ltd., trade name: A-1110) and 8 parts by weight of 1-(o-tolyl)biguanide in a powder state were used in lieu of addition of the mixture A.

Comparative Example 2

A curable composition was obtained in the same method as in Example 1 except that 4 parts by weight of γ-aminopropyltrimethoxysilane and 24 parts by weight of the mixture C obtained in Mix Example 3 were used in lieu of addition of the mixture A in Example 1.

Comparative Example 3

A curable composition was obtained in the same method as in Comparative Example 1 except that the mixture D obtained in Mix Example 4 was used in lieu of the mixture C used in Comparative Example 2.

Comparative Example 4

A curable composition was obtained in the same method as in Comparative Example 1 except that the polymer (A-2) was not used, and the polymer (A-1) was used in an amount of 100 parts by weight.

Comparative Example 5

A curable composition was obtained in the same method as in Comparative Example 2 except that the polymer (A-2) was not used, and the polymer (A-1) was used in an amount of 100 parts by weight.

Comparative Example 6

A curable composition was obtained in the same method as in Comparative Example 5 except that the mixture E obtained in Mix Example 5 was used in lieu of the mixture C used in Comparative Example 5. The mixture E had a white solid precipitated therein, but the mixture E which had been stirred immediately before use thereof to be in a uniform state was used.

Comparative Example 7

A curable composition was obtained in the same method as in Comparative Example 2 except that, in lieu of the mixture C, the mixture F obtained in Mix Example 6 was used in an amount of 32 parts by weight.

The surface cure time, surface cure time after storage, depth curability, cured product tensile properties, initial viscosity, viscosity after storage, surface states after smoothing the surface, and odors of curable compositions were evaluated on one-pack type moisture-curable compositions obtained in Examples 1 to 4 and Comparative Examples 1 to 7 based on the following methods. The results obtained are shown in Table 1. "After storage" as used herein refers to 28 days of standing of a container containing the one-pack type moisture-curable composition in an oven at 50° C. Thereafter, after leaving under conditions of 23° C. and 50% RH for not less than 24 hours, each of the evaluations was made on the same conditions as for the one-pack type moisture-curable composition in the initial state.

(Surface Cure Time)

Under conditions of 23° C. and 50% RH, each of the above curable compositions was spread to a thickness of about 3 mm with a spatula, and the surface of the curable composition was touched gently with a microspatula from time to time and the time required for the composition to become no more sticking to the microspatula was determined.

(Depth Curability)

Under conditions of 23° C. and 50% RH, each of the above curable compositions was packed into a polyethylene tube with a diameter of 12 mm without allowing entrance of bubbles, and the excess was scraped away with a spatula to make the surface level, giving a test sample. The test sample was allowed to leave under the same conditions for 7 days, the cured surface layer portion was then stripped off and, after removing the uncured portion thoroughly, the thickness of the cured portion was measured using vernier calipers.

(Cured Product Tensile Properties)

A 3-mm-thick sheet-shaped test sample was prepared from each of the above curable compositions, and then, set and cured by allowing the test sample to leave under conditions of 23° C. and 50% RH for 3 days and further at 50° C. for 4 days. No. 3 dumbbell specimens were punched out from the sheet and subjected to tensile testing using a Shimadzu model autograph at a pulling rate of 200 mm/minute, and the 100% tensile modulus, strength at break and elongation at break were measured.

(Viscosity)

Each of the above curable compositions was packed in a 100-cc cup so as to prevent air from entering the cup, and the viscosities at 2 rpm were measured using a BS type viscometer and a rotor No. 7 (products of Tokyo Keiki Inc.) under conditions of 23° C. and 50% RH.

(Surface State After Smoothing Surface)

Using a spatula, each of the above curable compositions was smoothed so as to have a thickness of about 3 mm, and the surface state was observed by eye.

(Odor of Curable Composition)

About 50 g of each of the above curable compositions was taken out of the container, and odors thereof were smelled.

TABLE 1

|  |  | Examples | | | | Comparative Examples | |
|---|---|---|---|---|---|---|---|
|  |  | 1 | 2 | 3 | 4 | 1 | 2 |
| Silyl group-containing | A-1 | 50 | 50 | 50 | 80 | 50 | 50 |
| organic polymer | A-2 | 50 | 50 | 50 | 20 | 50 | 50 |
| Calcium carbonate | Hakuenka CCR | 120 | 120 | 120 | 120 | 120 | 120 |
| Plasticizer | Actcol P-23 | 39 | 39 |  | 43 | 55 | 39 |
|  | Allyl group-terminated polypropylene glycol |  |  | 39 |  |  |  |
| Pigment | Tipaque R-820 | 20 | 20 | 20 | 20 | 20 | 20 |
| Antisagging agent | Disparlon 6500 | 2 | 2 | 2 | 2 | 2 | 2 |
| Physical property modifier | Excel O-95R |  |  | 3 |  |  |  |
| Ultraviolet absorber | Tinuvin 326 | 1 | 1 | 1 | 1 | 1 | 1 |
| Light stabilizer | Sanol LS-770 | 1 | 1 | 1 | 1 | 1 | 1 |
| Dehydrating agent | Vinyltrimethoxysilane | 2 | 2 | 2 | 2 | 2 | 2 |
| Adhesiveness-imparting agent | γ-Aminopropyltrimethoxysilane |  |  |  |  | 4 | 4 |
| Mixture A |  | 28 | 28 | 28 |  |  |  |
| Mixture B |  |  |  |  | 21 |  |  |
| Mixture C |  |  |  |  |  |  | 24 |
| Mixture D |  |  |  |  |  |  |  |
| Mixture E |  |  |  |  |  |  |  |
| Mixture F |  |  |  |  |  |  |  |
| 1-o-Tolylbiguanide |  |  |  |  |  | 8 |  |
| Surface cure time (min) |  | 60 | 45 | 35 | 45 | 40 | 35 |
| Surface cure time after storage (min) |  | 40 | 40 | 30 | 45 | 35 | 30 |
| Depth curability (mm) |  | 12.4 | 12.4 | 12.1 | 10.2 | 10.4 | 10.3 |
| Cured product tensile properties | 100% modulus (MPa) | 0.63 | 0.56 | 0.69 | 0.63 | 0.62 | 0.65 |
|  | Strength at break (MPa) | 2.10 | 1.98 | 2.20 | 2.05 | 1.68 | 2.00 |
|  | Elongation at break (%) | 495 | 575 | 445 | 590 | 460 | 500 |
| Initial viscosity (Pa·s) |  | 1060 | 1055 | 980 | 1015 | 1200 | 1080 |
| Viscosity after storage (Pa·s) |  | 2030 | 1640 | 1780 | 1530 | 1956 | 2340 |
| Change ratio of viscosity |  | 1.9 | 1.6 | 1.8 | 1.5 | 1.6 | 2.2 |
| Surface state after smoothing surface |  | smooth | smooth | smooth | smooth | small mass observed | smooth |
| Odor of curable composition |  | no odor | no odor | no odor | no odor | no odor | aceton odor |

|  |  | Comparative Examples | | | | |
|---|---|---|---|---|---|---|
|  |  | 3 | 4 | 5 | 6 | 7 |
| Silyl group-containing | A-1 | 50 | 100 | 100 | 100 | 50 |
| organic polymer | A-2 | 50 | 0 | 0 | 0 | 50 |
| Calcium carbonate | Hakuenka CCR | 120 | 120 | 120 | 120 | 120 |
| Plasticizer | Actcol P-23 | 39 | 55 | 39 | 39 | 39 |
|  | Allyl group-terminated polypropylene glycol |  |  |  |  |  |
| Pigment | Tipaque R-820 | 20 | 20 | 20 | 20 | 20 |
| Antisagging agent | Disparlon 6500 | 2 | 2 | 2 | 2 | 2 |
| Physical property modifier | Excel O-95R |  |  |  |  |  |
| Ultraviolet absorber | Tinuvin 326 | 1 | 1 | 1 | 1 | 1 |
| Light stabilizer | Sanol LS-770 | 1 | 1 | 1 | 1 | 1 |
| Dehydrating agent | Vinyltrimethoxysilane | 2 | 2 | 2 | 2 | 2 |
| Adhesiveness-imparting agent | γ-Aminopropyltrimethoxysilane | 4 | 4 | 4 | 4 | 4 |
| Mixture A |  |  |  |  |  |  |
| Mixture B |  |  |  |  |  |  |
| Mixture C |  |  |  |  | 24 |  |
| Mixture D |  | 24 |  |  |  |  |
| Mixture E |  |  |  |  |  | 24 |
| Mixture F |  |  |  |  |  | 32 |
| 1-o-Tolylbiguanide |  |  |  | 8 |  |  |
| Surface cure time (min) |  | 180 | 10 hours or more | 10 hours or more | 10 hours or more | 70 |
| Surface cure time after storage (min) |  | 480 | 10 hours or more | 10 hours or more | 10 hours or more | 60 |
| Depth curability (mm) |  | 9.8 | 6.5 | 5.8 | 6.9 | 9.5 |
| Cured product tensile properties | 100% modulus (MPa) | 0.53 | 0.56 | 0.58 | 0.59 | 0.66 |
|  | Strength at break (MPa) | 1.89 | 1.93 | 2.10 | 2.22 | 2.02 |
|  | Elongation at break (%) | 550 | 520 | 605 | 630 | 480 |
| Initial viscosity (Pa·s) |  | 1110 | 1465 | 1170 | 1720 | 740 |
| Viscosity after storage (Pa·s) |  | 2295 | 2785 | 1980 | 4760 | 2590 |
| Change ratio of viscosity |  | 2.1 | 1.9 | 1.7 | 2.8 | 3.5 |
| Surface state after smoothing surface |  | smooth | small mass observed | smooth | smooth | smooth |
| Odor of curable composition |  | alcohol odor | no odor | aceton odor | no odor | no odor |

Table 1 clearly indicates that in Examples 1 to 4 in which the amidine compound was dissolved in the propylene glycol compound and the amino group-containing silane coupling agent and then added, surface curing and depth curing were rapid, and the cured product exhibited favorable tensile properties: high strength and high elongation. Further, the rise in viscosity after storage was not great but favorable, and no agglomeration of the amidine compound was observed. On the other hand, in Comparative Example 1 and Comparative Example 4 in which the amidine was added as a powder, when the curable composition was smoothed, a small mass was observed on the surface, and the strength and elongation of the cured product were not sufficient. In Comparative Example 2 and Comparative Example 5 in which the amidine compound was dissolved in methyl ethyl ketone and then added, although the dispersibility of the amidine compound was favorable, acetone odor was emitted, which means that room environment may be deteriorated when used in a room. In Comparative Example 3 in which the amidine compound was dissolved in ethanol and added, although the dispersibility of the amidine compound was favorable, alcohol odor was emitted. In addition, the surface curability and depth curability were slow. In Comparative Example 6, an attempt was made to dissolve the amidine compound in polyoxypropylene diol, but the amidine compound was not dissolved even by heating and, after leaving at room temperature, a white precipitate occurred, which deteriorated workability thereof. The curable composition using this also showed a large viscosity increase after storage and poor viscosity stability. In Comparative Example 7, although the solubility of the amidine compound was favorable because of the combined use with polypropylene diol and the specific amine compound, the stability of the curable composition was poor and, therefore, there was observed a viscosity increase when the curable composition was left at 50° C. for four weeks.

The invention claimed is:

1. A one-pack curable composition, which comprises:
   100 parts by weight of an organic polymer (A) containing, in a molecule, a reactive silyl group represented by a formula: $—SiR^1_nX^1_{3-n}$,
   wherein the n $R^1$ groups each represent at least one member selected from the group consisting of $C_{1-20}$ alkyl groups, $C_{6-20}$ aryl groups, and $C_{7-20}$ aralkyl groups, and
   the (3−n) $X^1$s are each independently either a hydroxyl group or a hydrolyzable group;
   0.1 to 30 parts by weight of an amidine compound (B) represented by formula (1):

$R^2N═CR^3—NR^4_2$ (1), wherein the $R^2$, the $R^3$, and the two $R^4$s are each independently a hydrogen atom or an organic group;
   0.1 to 100 parts by weight of a plasticizer (C), which is (poly)propylene glycol alkyl ether; and
   0.1 to 20 parts by weight of an amino group-containing silane coupling agent (D),
   wherein the amidine compound (B) is preliminarily dissolved in the plasticizer (C) and the silane coupling agent (D) containing an amino group in a molecule, and
   a resultant mixture is mixed with the reactive silyl group-containing organic polymer (A).

2. The one-pack curable composition according to claim 1, wherein a main chain skeleton of the reactive silyl group-containing organic polymer (A) is at least one polymer selected from the group consisting of a polyoxyalkylene and (meth)acrylate ester polymer.

3. The one-pack curable composition according to claim 1, wherein the amidine compound represented by the formula (1) is a guanidine compound in which $R^3$ in the formula (1) is an organic group represented by a formula $—NR^5_2$, wherein the two $R^5$s are each independently an organic group.

4. The one-pack curable composition according to claim 1, wherein the amidine compound (B) contains an aryl group in a molecule.

5. The one-pack curable composition according to claim 1, wherein the plasticizer (C) has a boiling point of no lower than 200° C. at 760 mmHg.

6. The one-pack curable composition according to claim 1, wherein 3 to 100% by weight of the reactive silyl group contained in one molecule of the organic polymer (A) is a silyl group represented by a formula: $—SiX^1_3$, wherein the $X^1$s are each independently either a hydroxyl group or a hydrolyzable group.

7. A sealant,
   which comprises the one-pack curable composition according to claim 1.

8. An adhesive,
   which comprises the one-pack curable composition according to claim 1.

9. The one-pack curable composition according to claim 1, wherein the amidine compound (B) is at least one compound selected from the group consisting of 1-(o-tolyl)biguanide, 1-phenylbiguanide, 1-(o-tolyl)guanidine, and 1-phenylguanidine.

10. The one-pack curable composition according to claim 9, wherein the amidine compound (B) is at least one compound selected from the group consisting of 1-(o-tolyl)biguanide and 1-phenylguanidine.

11. A one-pack curable composition, which comprises:
    100 by weight of an organic polymer (A) containing, in a molecule, a reactive silyl group represented by a formula: $—SiR^1_nX^1_{3-n}$,
    wherein the n $R^1$ groups each represent at least one member selected from the group consisting of $C_{1-20}$ alkyl groups, $C_{6-20}$ aryl groups, and $C_{7-20}$ aralkyl groups, and
    the (3−n) $X^1$s are each independently either a hydroxyl group or a hydrolyzable group;
    0.1 to 30 parts by weight of an amidine compound (B) represented by formula (1):

$R^2N═CR^3—NR^4_2$ (1), wherein the $R^2$, the $R^3$, and the two $R^4$s are each independently a hydrogen atom or an organic group;
    0.1 to 100 parts by weight of a plasticizer (C), which is tripropylene glycol monobutyl ether; and
    0.1 to 20 parts by weight of an amino group-containing silane coupling agent (D),
    wherein the amidine compound (B) is preliminarily dissolved in the plasticizer (C) and the silane coupling agent (D) containing an amino group in a molecule, and
    a resultant mixture is mixed with the reactive silyl group-containing organic polymer (A).

12. A process for producing a one-pack curable composition that comprises 100 parts by weight of a reactive silyl group-containing organic polymer (A), 0.1 to 30 parts by weight of an amidine compound (B), 0.1 to 100 parts by weight of a plasticizer (C) and 0.1 to 20 parts by weight of an amino group-containing silane coupling agent (D), the method comprising:
    preliminarily dissolving the amidine compound (B) in the plasticizer (C) and the amino group-containing silane coupling agent (D); and mixing a resultant mixture in the reactive silyl group-containing organic polymer (A);
the reactive silyl group-containing organic polymer (A) containing, in a molecule, a reactive silyl group represented by a formula: $-\mathrm{SiR}^1{}_n\mathrm{X}^1{}_{3-n}$,
wherein the n $R^1$ groups each represent at least one member selected from the group consisting of $C_{1-20}$ alkyl groups, $C_{6-20}$ aryl groups, and $C_{7-20}$ aralkyl groups, and the (3−n) $X^1$s are each independently either a hydroxyl group or a hydrolyzable group;
the amidine compound (B) is represented by formula (1):

$$R^2N=CR^3-NR^4{}_2 \qquad (1),$$

wherein the $R^2$, the $R^3$, and the two $R^4$s are each independently a hydrogen atom or an organic group; and
the plasticizer (C) is a propylene glycol compound.

* * * * *

UNITED STATES PATENT AND TRADEMARK OFFICE
CERTIFICATE OF CORRECTION

| | | |
|---|---|---|
| PATENT NO. | : 8,415,444 B2 | Page 1 of 1 |
| APPLICATION NO. | : 12/522872 | |
| DATED | : April 9, 2013 | |
| INVENTOR(S) | : Yano et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 371 days.

Signed and Sealed this
Third Day of December, 2013

Margaret A. Focarino
*Commissioner for Patents of the United States Patent and Trademark Office*